United States Patent

Holtwick et al.

[15] 3,644,936

[45] Feb. 22, 1972

[54] METHOD FOR MEASURING PERFORMANCE OF A GENERAL PURPOSE DIGITAL COMPUTER

[72] Inventors: Gary M. Holtwick, Menlo Park; Kenneth W. Kolence, Palo Alto, both of Calif.

[73] Assignee: Boole & Babbage, Inc., Palo Alto, Calif.

[22] Filed: Jan. 23, 1970

[21] Appl. No.: 5,443

[52] U.S. Cl. ....................444/1

[51] Int. Cl. ....................G06f 9/19, G06f 11/06, G06f 7/02, G05b 23/02

[58] Field of Search ....................340/172.5, 146.1; 235/153

[56] References Cited

UNITED STATES PATENTS

| | | | |
|---|---|---|---|
| 3,206,747 | 9/1965 | Caspers | 340/172.5 |
| 3,377,471 | 4/1968 | Althaus et al. | 340/172.5 |
| 3,390,380 | 6/1968 | Cooke-Yarborough et al. | 340/172.5 |
| 3,406,379 | 10/1968 | Palevsky et al. | 340/172.5 |
| 3,411,140 | 11/1968 | Halina et al | 340/172.5 |
| 3,505,649 | 4/1970 | Evans | 340/172.5 |
| 3,521,239 | 7/1970 | Burrus | 340/172.5 |
| 3,036,770 | 5/1962 | Harrison et al. | 235/153 |
| 3,163,848 | 12/1964 | Abramson | 340/146.1 |
| 3,183,483 | 5/1965 | Lisowski | 340/146.1 |
| 3,309,678 | 3/1967 | Sargent et al. | 340/172.5 |
| 3,343,141 | 9/1967 | Hackl | 340/172.5 |
| 3,387,262 | 6/1968 | Ottaway et al. | 340/146.1 |
| 3,420,991 | 1/1969 | Ling | 235/153 |
| 3,491,340 | 1/1970 | Richman et al. | 340/172.5 |
| 3,213,427 | 10/1965 | Scmitt et al. | 340/172.5 |
| 3,286,239 | 11/1966 | Thompson et al. | 340/172.5 |
| 3,415,981 | 12/1968 | Smith et al. | 235/153 |
| 3,509,541 | 4/1970 | Gordon | 340/172.5 |
| 3,518,413 | 6/1970 | Holtey | 235/153 |
| 3,551,659 | 12/1970 | Forsythe | 235/153 |
| 3,568,157 | 3/1971 | Downing | 340/172.5 |
| 3,577,185 | 4/1971 | Belady | 340/172.5 |
| 3,585,599 | 6/1971 | Hitt | 340/172.5 |
| 3,585,603 | 6/1971 | Ross | 340/172.5 |

OTHER PUBLICATIONS

Cantrell, H. W. and Ellison, A. L., Proceedings of the Spring Joint Computer Conference, 1968, pp. 213–221.
Cambell, D. J. and Heffner, W. F., Proceedings of the Fall Joint Computer Conference, 1968, pp. 903–914.

*Primary Examiner*—Paul J. Henon
*Assistant Examiner*—Jan E. Rhoads
*Attorney*—Townsend and Townsend

[57] ABSTRACT

Apparatus and method for determining how a computer program is performing by sampling the operative conditions of a number of operating elements of a computer, such as the elements of the processing unit and the memory thereof. The information obtained from such sampling can be used to establish whether the program is "waiting," "executing" or "actively computing." Thus, a review of this information can be used to determine if the computer is being adequately utilized by the program and, if not, how it can be more efficiently utilized. The information is extracted randomly during the execution of the program following which the information is categorized and read out so as to be in an observable form.

9 Claims, 13 Drawing Figures

INVENTORS
GARY M. HOLTWICK
KENNETH W. KOLENCE
BY Townsend and Townsend
ATTORNEYS INVENTORS
GARY M. HOLTWICK
KENNETH W. KOLENCE
BY Townsend and Townsend
ATTORNEYS Patented Feb. 22, 1972 3,644,936

12 Sheets-Sheet 3

INVENTORS
GARY M. HOLTWICK
KENNETH W. KOLENCE
BY Townsend and Townsend
ATTORNEYS Patented Feb. 22, 1972 3,644,936

12 Sheets-Sheet 4

INVENTORS
GARY M. HOLTWICK
KENNETH W. KOLENCE

BY Townsend and Townsend
ATTORNEYS

Patented Feb. 22, 1972 3,644,936

12 Sheets-Sheet 5

INVENTORS
GARY M. HOLTWICK
KENNETH W. KOLENCE

BY Townsend and Townsend
ATTORNEYS

INVENTORS
GARY M. HOLTWICK
KENNETH W. KOLENCE
BY Townsend and Townsend
ATTORNEYS INVENTORS
GARY M. HOLTWICK
KENNETH W. KOLENCE
BY Townsend and Townsend
ATTORNEYS Patented Feb. 22, 1972 3,644,936

12 Sheets-Sheet 8

INVENTORS
GARY M. HOLTWICK
KENNETH W. KOLENCE
BY Townsend and Townsend
ATTORNEYS

INVENTORS
GARY M. HOLTWICK
KENNETH W. KOLENCE

BY Townsend and Townsend
ATTORNEYS

INVENTORS
GARY M. HOLTWICK
KENNETH W. KOLENCE
BY Townsend and Townsend
ATTORNEYS INVENTORS
GARY M. HOLTWICK
KENNETH W. KOLENCE
BY Townsend and Townsend
ATTORNEYS INVENTORS
GARY M. HOLTWICK
KENNETH W. KOLENCE
BY Townsend and Townsend
ATTORNEYS

METHOD FOR MEASURING PERFORMANCE OF A GENERAL PURPOSE DIGITAL COMPUTER

BACKGROUND OF THE INVENTION

This invention relates to improvements in the use of digital computers and, more particularly, to a method for measuring and analyzing the performance of a general purpose digital computer.

The efficient use of data-processing systems requires the balancing of a number of parameters, including those inherent in the data-processing system itself as well as those involved in scheduling the use of the data-processing system. Other parameters include the expenditure of manpower required to use and operate the data-processing system and the relatively large number of different ways in which the system can be utilized. In particular, improper balancing of these parameters can result in unnecessary, inefficient use of the system, thus resulting in unnecessarily high costs and long computer operating times.

The present invention is directed to data-processing systems of the type utilizing a general purpose digital computer having a processing unit, a main storage for storing programs and data, communication channels to external devices, an actuatable interrupt system, and means for actuating the interrupt system a number of times. The interrupt system permits the processing unit of the computer to be interrupted periodically as a result of conditions external to the data-processing system. Also, the interrupt system provides means for resuming operation of the processing unit after each particular interrupt interval has elapsed.

The actuating means for the interrupt system may be of any suitable construction but, for purposes of illustration, can be an interval timer such as a real time clock which is incremented or decremented on a fixed period. The clock can be operated from the conventional AC powerline frequency and operates asynchronously with respect to the operations of the data-processing system itself.

To carry out the teachings of this invention, a computer program is utilized with the foregoing elements of a general purpose digital computer. This program, called the extractor program, collects information about the performance of the computer as the latter operates in the normal environment. A second program, the analyzer program, processes the information developed by the extractor program so as to permit the information to be put into a usable, observable form. A typical embodiment of the extractor program starts extraction of the information as a problem program begins execution. Extraction terminates upon completion of the problem program under study.

The information obtained in carrying out the teachings of this invention can, for instance, include indications about the operational state of the processing unit of the computer, with respect to the problem program, when sampled, namely, whether the processing unit was "waiting," "executing" or "actively computing." For purposes of illustration, "waiting" indicates that the problem program was not able to proceed until the occurrence of a known event, such as input-output completion; "executing" indicates that the problem program was actively executing instructions in operating system load modules; and "actively computing" means that the problem program was actually executing instructions in a problem program when sampled. The information also identifies the name of the module or other distinct set of instructions which was sampled; whether or not the module was using overlays and, if so, the identification of the segment of the module which was sampled; and the cause of the "waiting," as for example, the particular file or data set being referenced, and, when the problem program is found to be "waiting," "executing," or "actively computing," the location in the problem program which initiated this condition. When in a multiprogramming environment, the information also includes indications about whether the computer has been under control of the problem program and about which modules or other distinct set of instructions have had such control.

The operating elements of the computer which are sampled by the use of the present invention include at least certain of the various registers in the processing unit and the various storage devices of the main memory of the computer. The information thus obtained is a measure of the operating conditions of such registers and storage devices, specifically the binary values contained therein at the time the various interruptions occurred. Some of these values represent, therefore, the "waiting," "executing" and "actively computing" conditions of the computer and such values can be stored in the main memory in blocks or groups to complete the extraction of the information.

Not all such operating conditions of the above elements are stored. For instance, some of the conditions can be compared with each other and counters can be accumulated or decremented and the like so as to result in a representation which can itself be stored. After storage of the information representing the desired operative conditions, an analyzer program can be input into the computer to assemble the information in usable form. The information can also be output to an external device and then input into the computer with the analyzer program, perhaps with information from one or more other extractions of the same problem program. Then the information is output in an observable form. The information can then be reviewed to see how much time is being spent, for example in various functions and in the various modules of the problem program. It is convenient to consider the operating conditions being sampled in three groups. The first set relates to the computer itself independent of any program being run on it, such as whether or not a tape unit is in use. The second set relates to the operating system and the tables and other data maintained therein independent of any other programs present, such as the table of status of all devices in the computer. The third set relates to one or more problem programs, how many depending on the particular embodiment, such as particular entries in an operating system table or the instruction last executed by a problem program. Any particular embodiment will concentrate on different operating conditions in each of the three sets.

SUMMARY OF THE INVENTION

A primary object of this invention, therefore, is to provide a method for use in measuring the efficiency of utilization of a general purpose digital computer operating under the control of a problem program wherein the efficiency is established by accurately identifying the portions of the problem program which require the most operating time of the processing unit of the computer, whereby the results of the measurement will provide an indication how the problem program can best be modified to provide the most efficient utilization of the processing unit. Another primary object of this invention is to provide a method for use in measuring the utilization of a general purpose digital computer wherein various operating conditions relating to the computer itself, the operating system and any problem programs are sampled.

Another object of this invention is to provide a method of the type described which operates to sample the operating conditions of a number of operating elements of the computer during each of a plurality of intervals in which control of the computer is interrupted so that the sampled information can be put in a form suitable for use in determining, for example the "waiting," "executing" and "actively computing" times of the computer with respect to a problem program. Thus, an analysis of the information will assist users of data-processing systems in setting the parameters inherent in the system, in efficiently scheduling the use of the data-processing system, in reducing the time a program spends in the data-processing system, in formulating standards for efficient use of the data-processing system, in reducing the time required to create programs for use in the data-processing system, and, in general, evaluating programming theory and techniques.

A further object of this invention is to provide a method of the aforesaid character which operates to distinguish accurately between the time required to carry out a problem program in the processing unit of the computer and that spent in programs supplied by the manufacturer of the computer.

Other objects of this invention will become apparent as the following specification progresses, reference being had to the accompanying drawings for an illustration of an embodiment of the apparatus of the invention, the specification relating, for purposes of illustration only, to the execution of programs under Operating System/360 (MVT) of an IBM System/360 general purpose computer. The terms used in the specification in describing the present invention will be known to one familiar with the internal design of said Operating System. However, the various terms used are defined so as to be understood by one familiar with the internal design of an operating system for any general purpose computer. Any such operating system will record status in similar tables and maintain similar control information.

To aid in the description of this embodiment, an assembly language listing of the extractor program is presented as APPENDIX A at the end of the specification. Throughout the description cross-reference is made to the sequence numbers in this listing.

GENERAL DESCRIPTION

Figure 1:
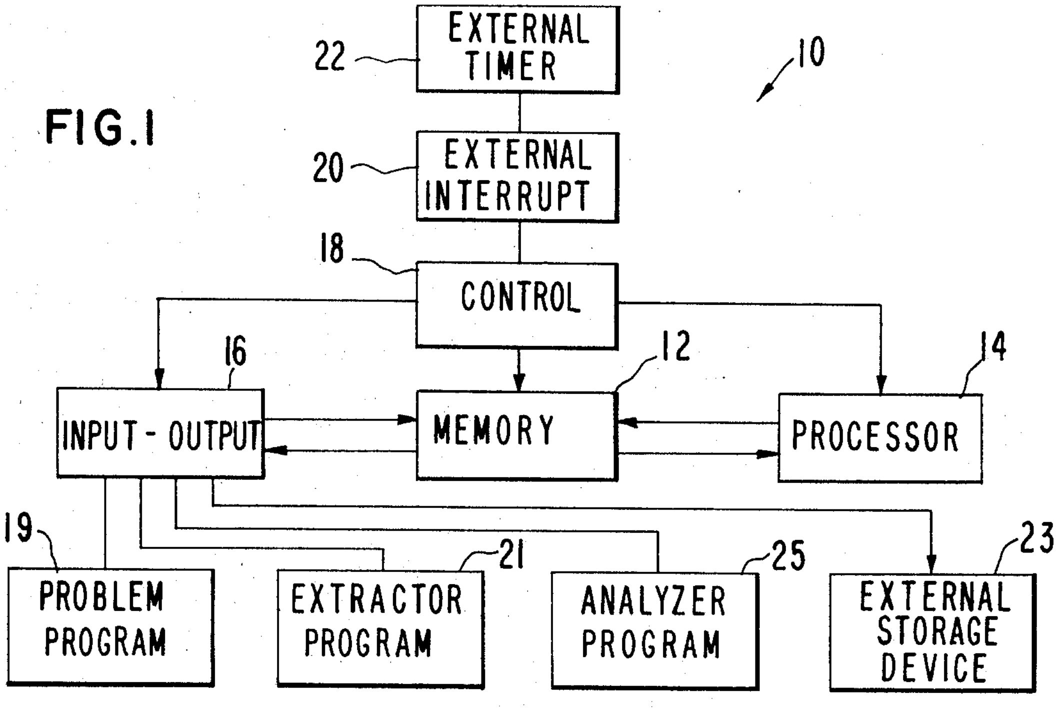
FIG. 1 is a block diagram of a general purpose digital computer having an external interrupt means utilized in carrying out the teachings of the invention.

FIG. 1 illustrates a general purpose digital computer 10 usable with the method of the present invention. Computer 10 has a main memory or storage 12, a processing unit 14, an input-output unit 16, and a control means 18, all of the elements being coupled together in the manner shown in FIG. 1 to permit data and instructions to be read into and out of the memory and to permit data to be processed by processing unit 14 under the influence of control 18. The computer is adapted to be operated under the control of a problem program 19 which is stored in the main memory through input-output unit 16. The present invention has as one of its purposes the measurement of the efficiency of utilization of computer 10 when the latter is operating under the control of problem program 19. For convenience only one problem program is shown but, as will be made clear below, more than one problem program can be measured, or measurement can concentrate on the computer as a whole, including the operating system which controls operation of the various problem programs.

To carry out the present invention, an extractor program 21 is used to effect sampling of information about the operating conditions of at least certain of the operating elements of computer 10 as hereinafter described. Such information, after being sensed and stored in memory 12, can be output to an external storage device 23 if the need arises for additional space in memory 12. The stored information, after sampling operations of computer 10 have been completed under the control of extractor program 21, is then analyzed and rearranged by computer 10 operating under the control of an analyzer program 25. As a result of this operation, the information can be printed out in observable form so that a programmer can view the printout and determine how the utilization of the computer can be improved.

The invention further makes use of an actuatable, external interrupt device 20 coupled to control 18 for periodically interrupting the operation of the computer. Each time the computer is interrupted, it is under control of extractor program 21. When the computer is under the control of the extractor program, the operating conditions of a number of operating elements of computer 10 are noted by storing the binary representations of such conditions in main memory 12. At the end of each such time period, control of the computer is relinquished by the extractor program.

Interrupt device 20 is periodically actuated by an external timer 22 so that control of the computer can pass at periodic intervals to the extractor program. The timer can be set to actuate the interrupt device at any one of a number of different time periods but, for purposes of illustration, the length of each time period is set to one-sixtieth of a second or a multiple thereof.

The sampling of information by the extractor program is done randomly with respect to the operation of computer 10 because the population under study and the device controlling the sampling, namely, the interval timer, are uncorrelated. The population under study is, for example the set of all instruction executions which take place in a problem program. The temporal sequence of these executions is asynchronous with respect to the basic cycle of the interval timer.

The parameters being measured are all binary, i.e., true or false, 0 or 1. Furthermore, the populations being studied are characteristically large, namely, the states of the machine over all executions. Of particular interest are the mean values of various parameters of these populations (e.g., the "percentage of time at location *n*" is the mean value of the binary parameter which is 1 when at location *n* and 0 when not). $M_p$ will denote the value of this mean for the population as a whole, i.e., $M_p$ is the true mean.

The process of measurement is to sample a population and compute a mean for the sample, $M_s$. The question of interest is then how large the difference between $M_s$ and $M_p$ might be. A result of central importance in modern probability theory, known as the Central Limit Theorem, says that for a population size of $N$ and a sample size of $n$ and for populations with finite variance, the means of the sample means is the mean of the population, the distribution of the sample means is the normal distribution and the standard deviation of the sample means is given by:

$$\sigma_s = \sqrt{\frac{N-n}{N-1}}\,\frac{\sigma_p}{\sqrt{n}} \qquad (1)$$

where $\sigma_p$ is the standard deviation of the population.

The number $$\sqrt{\frac{N-n}{N-1}}$$

is called the finite population factor. For an infinite population it is unity and in any case it is $\leq 1$; furthermore, it will be very nearly 1 unless a very large fraction of the total population is being sampled. For instance, even if $n=N/4$, the value of the finite population factor is approximately 0.87; in the case of sampling once a microsecond on a machine whose master oscillator runs at a 50-nanosecond rate, it would be about 0.97. The point is that in all cases of interest, it is very nearly 1, and that, in any event, the case where it is significantly less than 1 is a favorable one. It is, therefore, justifiable to assume it to be 1 and (1) becomes:

$$\sigma_s = \sigma_p / \sqrt{n} \qquad (2)$$

Furthermore, although the Central Limit Theorem is not true for populations with zero variance, that case is also a favorable one since any sample would then, with probability 1, have the same mean as the population.

In determining how "good" a sample is, probability or degree of confidence, *p*, and an interval of error, I, must be stated. Then a statement of the form "If $M_s$ differs from $M_p$ by I or more, then an event with probability *p* occurred when the sample was drawn" can be made. Obviously, the smaller both I and *p*, the greater the confidence in the measurements.

Before making estimates of the above kind, however, account must be taken of a difficulty in (2), namely, that the standard deviation of the sample means depends on the standard deviation of the population, which is unknown. However, it is known that:

$$\sigma_p = \sqrt{M_p - M_p^2} \qquad (3)$$

If $a, b \geq 0$, the number $\sqrt{ab}$ is called the geometrical mean of $a$ and $b$ and the number $(a+b)/2$ is called the arithmetical mean of $a$ and $b$ and:

$$\sqrt{ab} \leq (a+b)/2$$

with equality if and only if $a=b$. So:

$$\sqrt{M_p - M_p^2} = \sqrt{M_p(1-M_p)} \leq (M_p + 1 - M_p)/2 = ½$$

and so:

$$\sigma_p \leq ½ \qquad (4)$$

Applying (4) to (2) and rewriting:

$$\sigma_s \ \sqrt{n} \leq ½ \qquad (5)$$

Now for an internal of error, I, an error of as much as $I$ represents an excursion of:

$$I/\sigma_s = k$$

standard deviations from the mean. Rewriting:

$$I/k = \sigma_s$$

$$(I/k) \ \sqrt{n} \leq ½$$

$$I \ \sqrt{n} \leq k/2 \qquad (6)$$

and (6) is the final estimate. It should be pointed out that the upper bound given in (6) is attained for $M_p = ½$ so that the number of samples given in (6) is sometimes necessary and always sufficient for the given level of confidence. To take an example, suppose it is desired to choose a sample size in such a way as to have confidence at a level of 1,000 to 1 that the error is no more than 1 percent. A table of the normal distribution would show $k$=3.3 to give approximately those odds so:

$$0.01 \ \sqrt{n} \leq 3.3/2 \text{ or } \sqrt{n} \leq 330/2 = 165$$

So a sample size of $(165)^2 = 27{,}225$ would give the required level of confidence.

Processing Unit 14 is comprised of a number of registers by means of which computations can be carried out. Main memory 12 is comprised of a number of storage devices, such as magnetic cores, flip-flops or the like. At least certain of these elements are the ones whose operating conditions are to be sensed to establish the manner in which the computer is being utilized. Each of these operating elements has an operating condition at any time which can be represented by a binary value. These binary values, during a sampling interval, are stored in main memory 12 in blocks of information so that, over a relatively large number of sampling intervals, a relatively large amount of information is stored. Before this information is stored, some of the information is manipulated so as to obtain other information to be stored. For instance, the operating condition of two or more registers can be compared with each other, can be added to each other or can be subtracted from each other to arrive at additional information which is to be stored in the memory instead of the information initially obtained. The transfer of information in the memory does not, of course, affect the status of the registers, storage devices and the like. Thus, the operation of the computer can be interrupted so that sampling of information can occur, following which the operation of the computer can resume after completion of the sampling and with the same operating conditions which existed at the time of the interruption.

In considering the sampling process, the relationship between the problem program being sampled and the operating systems should be considered. In addition, if the particular operating system provides for multiprogramming, the possible presence of other problem programs is to be accounted for. Further, if the operating system allows a problem program to switch control between independent subprograms or tasks (multitasking), the sampling process should account for all such tasks. In the most general situation, the extractor program determines how many tasks are active in a problem program, which tasks, if any, have had control of the computer since the last sample, or are waiting for some event to occur, what the operating conditions for each such task are at the time of sampling and whether the task itself was computing or, instead, whether the operating system was preforming some system function for the task. While the embodiment described below is concerned with but a single program, the concept can just as easily be applied, for example, to more than one or all problem programs, or be restricted to a part of one problem program, or sample only the operating system itself, without distinguishing problem programs.

In use, the extractor program is first loaded into the computer memory, i.e., prior in time to the problem program which it is to sample. This is a convenient method to use because it allows the extractor program to complete all necessary initiation before any operating conditions associated with the problem program have changed. It also means that the problem program can be sampled without requiring any modification. It should be noted that other loading sequences might be more appropriate, as for example, when more than one problem program is being sampled, when it is desired that the problem program exercise some control over the start and end of sampling, or when sampling is primarily concerned with the operating system.

To execute the extractor program, several parameters must be established. These are the name of the problem program module being executed, the sample rate of the extractor program, whether the extractor program is to identify the input-output wait time by data set, and the configuration identification when more than one hardware/software configuration is available.

Wait time identification is just one of many operating conditions which can be determined. In the particular embodiment described below, it is the only one which is made optional. Others could be made optional, as might be appropriate if sampling was concentrated on operating system functions. Similarly specification of the particular configuration used could be ignored or be kept track of by the user. It might also be available as one of the operating conditions which can be sampled.

It is also convenient to allow the user to restrict the area of his problem program to be sampled in detail. In the present embodiment, the user may specify as parameters, the beginning and ending location of the area of his problem program which he desires to have sampled. When the problem program is found to be executing or waiting outside this area, no operating conditions are sampled beyond a test for waiting or not waiting.

This area is simple called "the sample." Unless changed by these parameters, the sample will be the entire memory block occupied by the problem program, which is equivalent to saying that the entire problem will be the sample.

Figure 2:
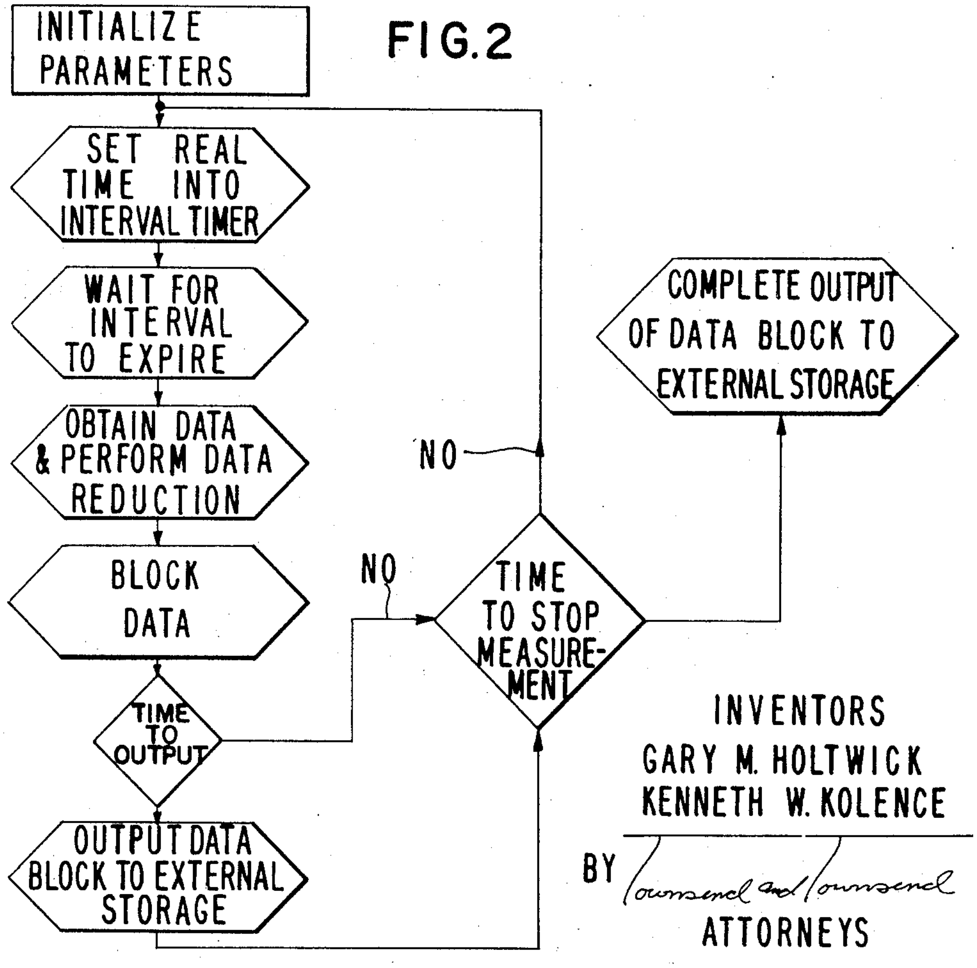
FIG. 2 is a flow chart representing one embodiment of the extractor program of the present invention in its broad sense.
Figure 2A:
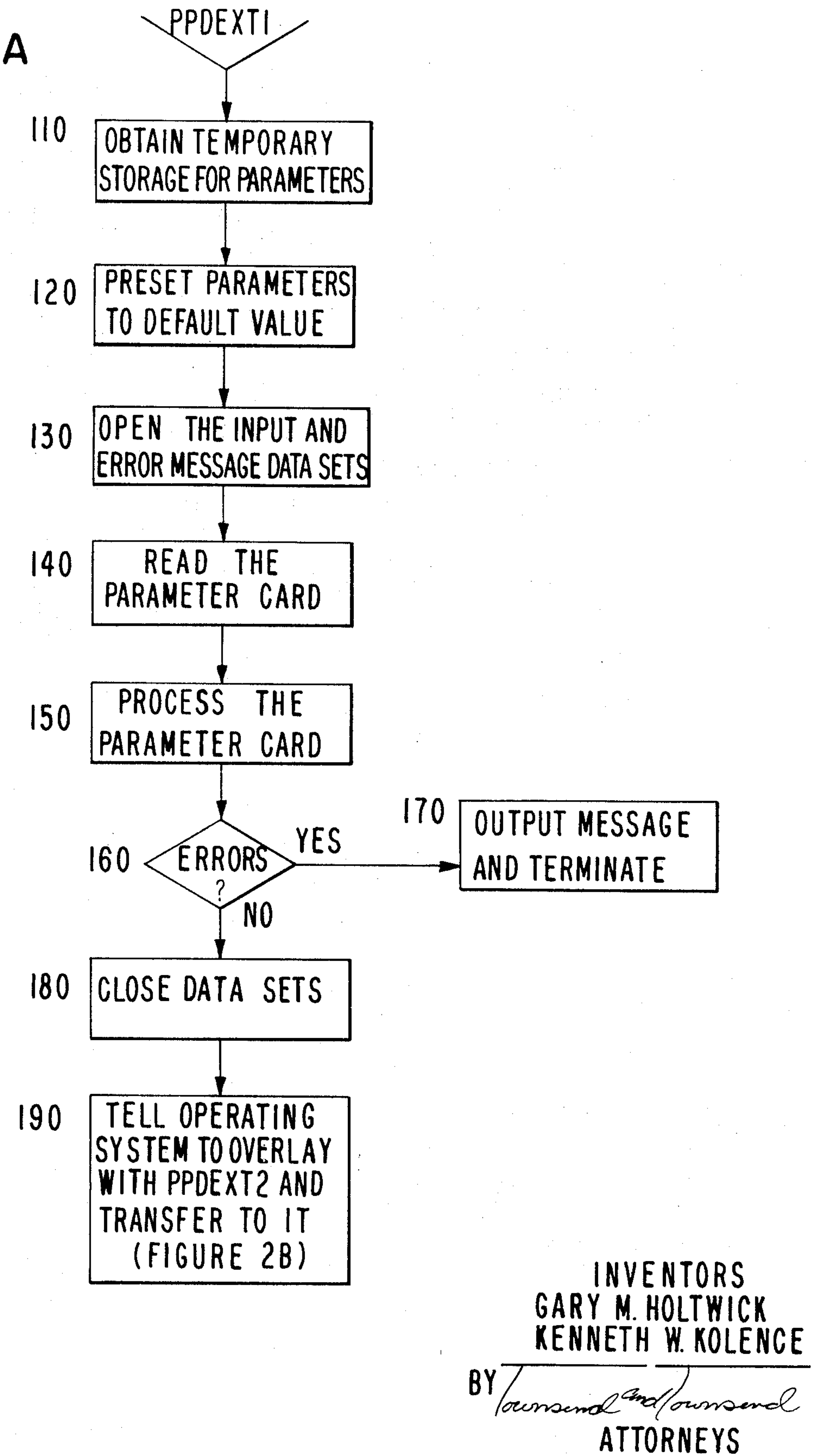
FIG. 2A–2I are detailed flow charts of the embodiment of FIG. 2.

The present embodiment of the extractor program which for purposes of illustration only, is in two parts, PPDEXT1 and PPDEXT2. PPDEXT1 processes the single parameter card while the extraction itself is done by PPDEXT2. PPDEXT2 is loaded into the same memory area as PPDEXT1. FIG. 2A is a flow chart of PPDEXT1 which begins at sequence number 00600 in the appended listing.

The extractor program processes the aforesaid parameters and stores their values in memory. In particular at Block 110 temporary space is obtained for storage of the parameters. Under OS/MVT, it is convenient to use temporary space to pass the parameters from PPDEXT1 to PPDEXT2 because it is not convenient to set up an area of memory within one subprogram which can be accessed by a subprogram which replaces it. Instead the system macro "GETMAIN" is used to obtain the temporary space (sequence 00690). Under other operating systems, it may be convenient to use an area which is part of PPDEXT1 or to use some memory area which is part of the operating system. This latter would be the case if the extractor program were, for example, assembled as part of the operating system.

At Block 120 default values of the parameters are moved into the temporary storage area (sequence 00720). Recall that the parameters in the present embodiment are the name of the program to be sampled (no default), the sample rate (default of one sample each one-sixtyth of a second), sampling input/output wait by data set (default no), configuration identification (default blank), and sample boundaries (default the whole program).

At Block 130, the operating system is requested to prepare the input and error message data sets for use. This is done by an "OPEN" request (sequence number 00740). At Block 140, the parameter card is read. This is done by the appropriate system request, here a "GET" (sequence number 00750).

At Block 150, the parameter card is processed and the parameters if any, checked for errors. Some errors may be substantive, such as the lack of a program name to be sampled. Other errors may be in form, such as improper characters. The particular parameter-processing instructions used begin at sequence number 00760 but an appropriate set could be written to handle different parameters. If errors are found (Block 160) an appropriate message is output (Block 170) and the extractor programs terminates.

Otherwise the operating systems is requested at Block 180 to terminate use of the input data set and error message data set (here "CLOSE", sequence number 02160). Then the necessary operating system function is requested at Block 190 to cause the second part of the extractor program, PPDEXT2, to be loaded in place of PPDEXT1 and control is passed to PPDEXT2 (here "XCTL", sequence number 02170).

Figure 2B:
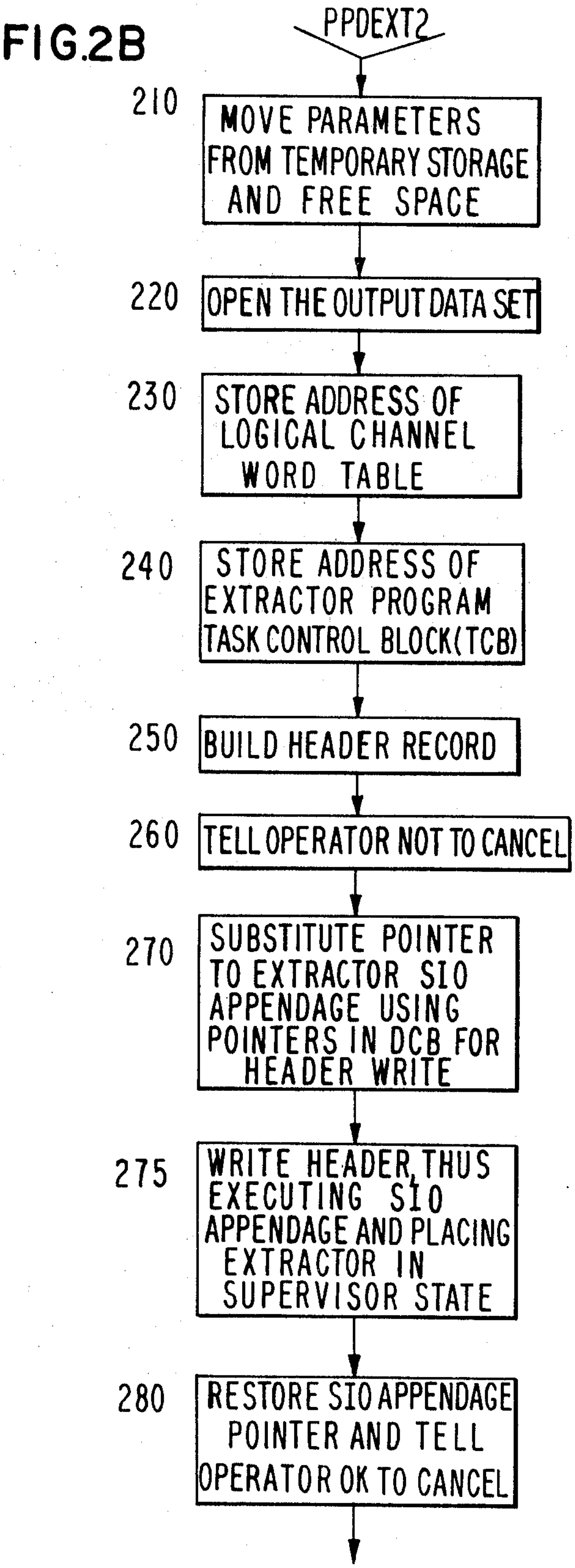
Figures 1, 2B:
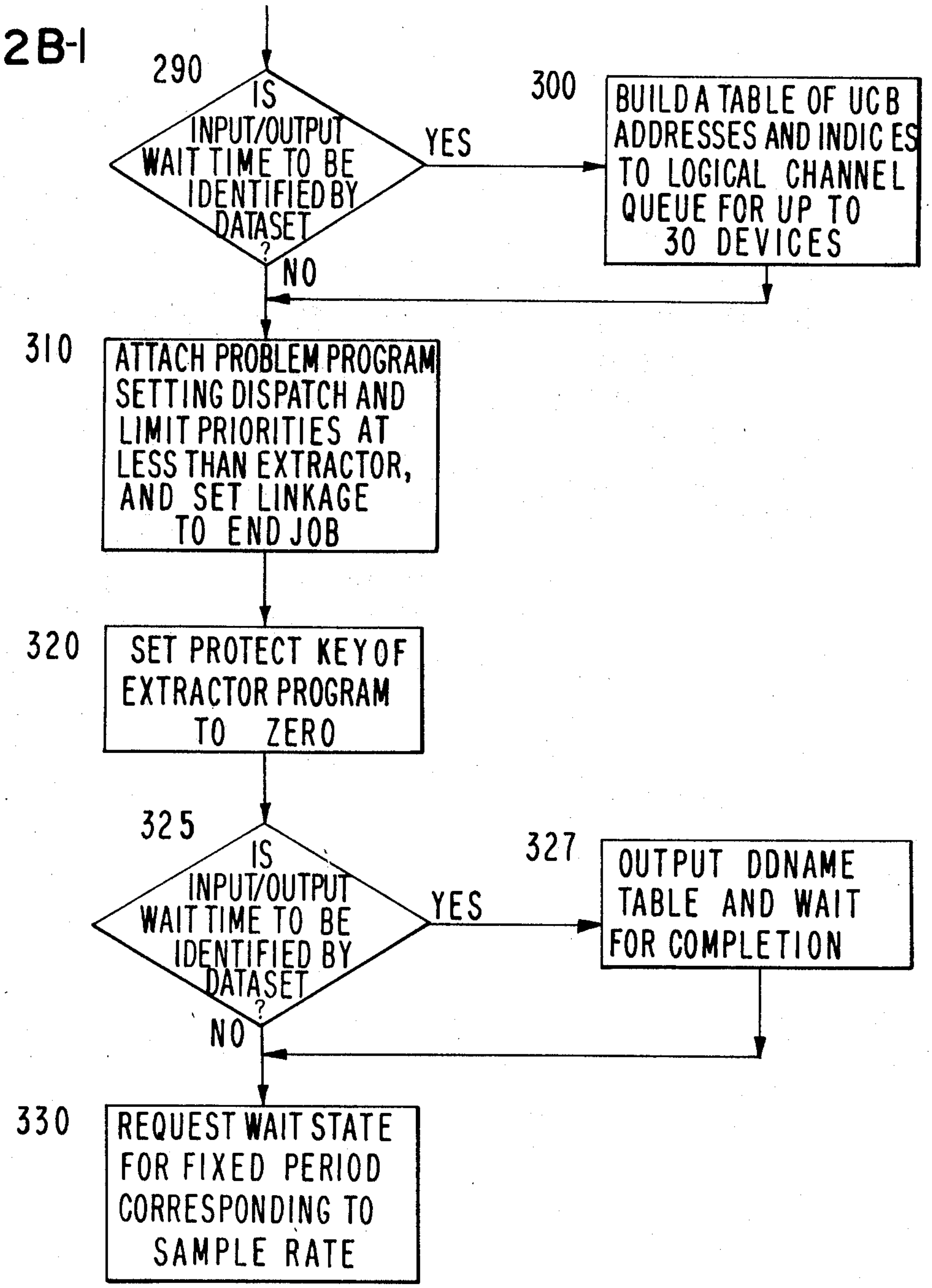

Certain initialization is also done in PPDEXT2 as shown in the flow chart in FIG. 2B. At Block 210, the parameters processed in PPDEXT1 are moved to a local storage area within PPDEXT2 (sequence number 04000). The extractor program then executes the necessary program steps to prepare the external device to receive the information to be collected. For instance, at Block 220, the necessary operating system function is requested to prepare the output data set for receiving the information to be collected by the extractor program (here "OPEN" sequence number 04130).

An operating system stores various operating conditions in various tables. It is convenient to include at least some of these operating conditions among the operating conditions to be sampled. In order to make this sampling easier, it is convenient to store the address of at least some of these tables within the local storage area of PPDEXT2. At this point in the processing, the present embodiment of the extractor program is concerned with two such tables; others will be introduced below. The logical channel word table contains operating condition data for units assigned to a device which is treated as being more than a single device, such as a channel-to-channel adapter. At Block 230, the address of the logical channel word table is saved (sequence number 04150). For each task present in the computer, the operating system keeps a table of operating conditions called a task control block (TCB). The TCB for the extractor program itself will be used during the sampling process so at Block 240 (sequence number 04180) the address of the task control block for the extractor task is stored in memory.

Certain operating conditions remain constant throughout the time of sampling. It is convenient to obtain at least some of these operating conditions prior to the beginning of actual sampling. These operating conditions are then output to the external device only once as a header record. Examples of such operating conditions are the boundaries of the area to be sampled, the name of the problem program to be sampled, the time extraction began and the date. Other operating conditions could be collected, especially if sampling were to be concentrated on the operating system itself. These operating conditions are gathered into a storage area for subsequent output (Block 250, sequence number 04220).

Many general purpose computers, including the IBM/360, have special instruction modes which prevent a problem program from executing certain instructions and from changing locations in the storage area occupied by the operating system or other problem programs. In order for the extractor program to be able to sample at least certain operating conditions, it must be able to operate in the privileged mode. In the IBM/360, this mode is called "supervisor state." For each operating system a different technique will be required to allow such privileged operation. In some it may be necessary to change the operating system itself, although usually a skilled system programmer can determine the necessary techniques.

The present embodiment uses a Start Input Output (SIO) appendage to place the extractor program in supervisor mode but with a nonzero protect key. This programmer-written routine is normally intended, for example, to allow special processing of data or status before or after an input/output operation. Because all interrupts (except machine malfunction) are disabled while an appendage is executed, it is a convenient mechanism for putting the extractor program in supervisor state. Several appendages are available but the one used in the present embodiment is the one executed before an input/output operation.

One restriction must be observed when an appendage is used for such an "abnormal" purpose, namely the program cannot be cancelled or terminated while the procedure described below is executed. For this reason, the computer operator is informed at Block 260 that he should not cancel the extractor program (sequence number 04671). At Block 270, the prewrite operating system appendage normally associated with writing the header record is temporarily changed to the extractor program appendage. Details are left to the listing (sequence number 04680) but essentially a pointer in the data control block (DCB) containing the control information for the header record write operation is used to locate the pointer which will cause execution of the operating system appendage. All of the operating system provided pointers are saved when the pointer to the extractor program appendage is substituted.

At Block 275, the extractor program provided appendage is executed when the operating system writes on the external storage device a header record containing such general information as the job name, step name, date, time, and sample bounds, as mentioned above in connection with Block 250 (here "WRITE," sequence number 04820). In the appendage itself (sequence number 10230), the program status word (PSW) for the extractor program is changed so that the extractor program will run in supervisor state.

This PSW is loaded into a hardware register when the extractor program is executed and changing the PSW while in the appendage means that when the PSW is again loaded to return control to the extractor program itself, the extractor program will be in the supervisor state.

After the write of the header record is completed, the original SIO appendage pointers are replaced and the operator is informed that he can again cancel the extractor program, if necessary (Block 280, sequence number 04870).

In order that the extractor program can properly sample, it will also be convenient to set its storage protection key to the same as that of the operating system, namely zero. The storage protection key is a hardware device which prevents a program in a memory block at one storage protection key from changing anything in a memory block at different key, except that a program in a memory block with a key of zero can change anything in any memory block. However, this change of protect key is delayed until the problem program is loaded, as described below.

As discussed above, one option available in this embodiment is to identify input/output wait time by associated data set. Sampling of these operating conditions is one example of the type in which it is convenient to gather certain information into a table within the extractor program in advance rather than to process this information each time the operating conditions are sampled. In particular, this sampling should provide for processing of the Unit Control Block (UCB), the status and control table for an input/output device, for the device assigned to each data set used by the problem program. In addition, as described below, it should provide for processing of the request queue for the logical channels discussed above. Therefore, at Block 290, a test is made to determine if input-output wait time is to be identified by data set (sequence number 04900). If so, at Block 300 a table containing the addresses of the Unit Control Blocks (UCB) for the up to 30 unique devices encountered in the Task Input-Output Table (TIOT) is constructed in memory. If more than 30 devices are used, the remainder are ignored. It is of course, necessary to choose some limit and thirty is convenient. This table is constructed by searching the control table built by the operating system at the time that it processes the data set control cards for the problem program, namely the Task Input-Output Table (TIOT) (sequence number 04920). Additionally, a table containing the index to the logical channel queue for each of said UCB locations, is constructed in memory (sequence number 05392). The output to external storage device 23 of the list of the DDNAMES (the name the problem program uses in performing input/output operation) for each UCB is delayed until loading of the problem program has been initiated.

In every operating system there are one or more ways in which to load the problem program to be sampled. In some, it may be necessary to have it loaded with the extractor program, while others, i.e., OS/MVT, allow the extractor program to control the loading. OS/MVT provides the capability called "tasking" wherein one program can cause loading and execution of an essentially independent program which is then called a task. This is to be distinguished from the more usual concept of subroutine or subprogram which is physically part of another program. The extractor program loads the problem program using an ATTACH macro, setting the problem program's dispatching and limit priorities at a value lower than that of the extractor program (Block 310, "ATTACH", sequence number 05420), so that the problem program runs at a lower priority than the extractor program. The concept of priority is an adjunct to tasking because the operating system must be told which task should have access to a computer function when more than one requires it. In addition, when the system function for loading is requested, a request is made that, upon completion of the problem program, control is to return to the extractor program's asynchronous exit routine; (ENDJOB, FIG. 21).

At Block 320, the extractor program can now protect itself from inadvertant destruction by the problem program by setting the protection key for itself and its memory to zero, as mentioned above. This was not done earlier because then the problem program would also have had a zero protect key. In the IBM/360 the PSW of the extractor program must have the proper bits set to zero. The protect key of the extractor program itself is set to zero by using an LPSW instruction (sequence number 05422). This can be done because the extractor program operates in supervisor state (see Block 275). The extractor program sets the protect key of the said asynchronous exit routine to zero by obtaining the location of the interrupt queue element (IQE) from the task control block (TCB) of the problem program task. The operating system had set up an interrupt queue element (IQE) to control handling of interrupts associated with end-of-job in the problem programs. The extractor program then obtains from said IQE the location of the interruption request block (IRB) from which the location of the required PSW is found which will be loaded at end-of-job in the problem program, thus transferring control to the extractor program's end-of-job processing routine. By setting the proper bits in this PSW to zero, the extractor program's end-of-job processing routine will have a protect key of zero (sequence number 05432). In addition the extractor program sets the protect keys of the memory block occupied by the extractor program to zero, which again can be done because the extractor program is in supervisor state (sequence number 05435).

At Block 325, the extractor program determines if input/output wait time is to be identified by data set (sequence number 05441). If so, the operating system is requested to output the table of DDNAMES mentioned above. Then data set oriented wait can be identified by an index to this table instead of using the full DDNAME. The extractor program waits for this output to be complete. It is convenient to request this output after loading of the problem program is initiated because the loading will normally take longer.

In Block 330 (sequence number 05850) the extractor program uses a STIMER macro to place the extractor task in wait state for the time period corresponding to the sample rate processed and stored in Block 150 (FIG. 2A). Control of the computer is then relinquished by the extractor program and the extractor program waits. Control will be transferred by the Operating System to the highest priority program ready to receive it. This may or may not be the problem program being sampled.

Figure 2C:
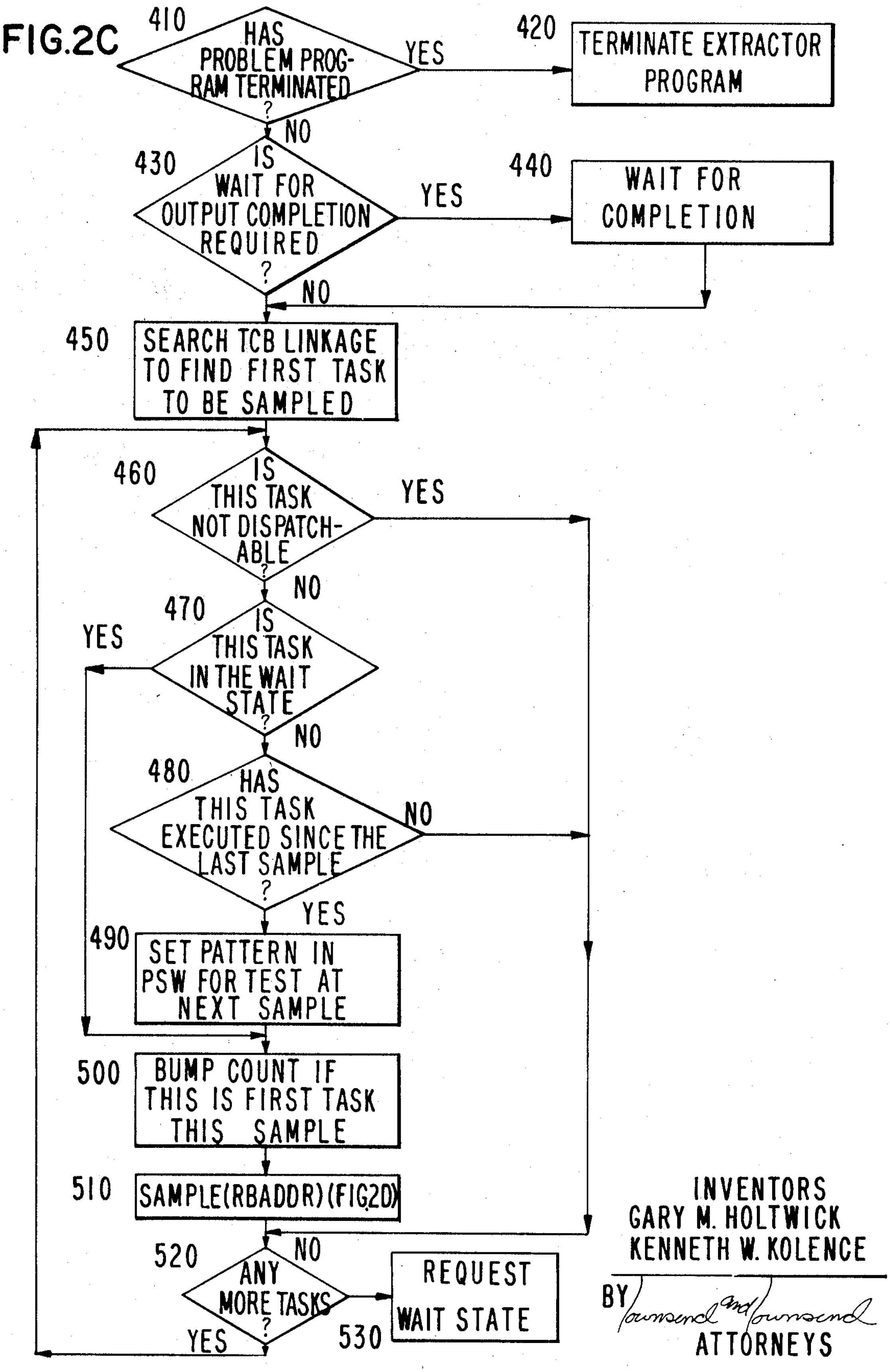

When the aforesaid time period has elapsed, control is returned to the extractor program at Block 410 in FIG. 2C. The current status or operating conditions of the registers, storage devices and the like including the contents of various tables maintained by the operating system, will be indications about whether or not the computer in relation to the problem program was, for instance, "waiting" or "not waiting." A specific binary value will define each such indication and the binary values which are to be used in carrying out the method of the invention are stored in specific locations in memory. Many such values are stored or packed in blocks in the memory so that a wide variety of status information is stored for each interrupt interval. Which of the operating conditions are sampled and what information is recorded depends on the embodiment of the extractor program. Thus if primary interest centers on the operating system itself, operating conditions associated with usage of processor 14, external storage devices, such as 23, memory 12 and the like, could be sampled. If interest centers on a single problem program, as in the current embodiment, then operating conditions associated primarily with the problem program will be sampled.

At Block 410, a test is made to determine if the problem program has terminated (sequence number 05940). If so, the extractor program itself terminates at Block 420 (sequence number 05820), after loading registers as required by the operating system, including a code, called the "completion code," related to the termination status of the problem program. This test is in connection with the end-of-job routine and is described in more detail below in connection with FIG. 21.

Next, at Block 430, a check is made to determine if information had been output to an external device during the previous sample (sequence number 05960). Of course, no such output will have been made prior to the first sample. If there was such an output, the extractor program waits at Block 440 until it is completed (sequence number 05970).

In many operating systems a problem program can not cause "independent" tasks to be executed. The word "independent" is used to mean that execution of the task proceeds independently from other tasks (although a task may have to wait for the completion of some event associated with another task) and the operating systems maintains separate control and status tables for each task. However, because each task is initiated by some other task, these control tables are linked together in some fashion, such as the initiating task's control table contains the address of the initiated task's control table. Under OS/MVT these control tables are called task control blocks (TCB). While details are left to the listing (sequence number 06000) and the relevant IBM manuals, the extractor program can access the TCB of each task initiated by the problem program including the problem program itself by starting with the TCB of the extractor program. The extractor program will sample each task separately, recording operating conditions for each as if it were a problem program.

The extractor program samples each task of the problem program. At Block 450, the extractor program locates the first task to be sampled by tracing through the TCB linkages (sequence number 06010). If no additional tasks were initiated by the problem program, then this first task will be the problem program itself.

Under OS/MVT it is common practice to have tasks become inactive due to normal or abnormal termination, and, therefore, they may not be on the system TCB queue or table but yet remain linked in the problem program's TCB queue. Such a task is said to be not dispatchable. This happens because the task is not removed until a specific request is made to do so. Each task is, therefore, checked for dispatchability before it is sampled. In particular at Block 460 the TCB for the current task is checked to determine if the task is not dispatchable (sequence number 060424). If so sampling of the task is skipped and processing continues at Block 520.

In addition to the dispatchability requirement, a task will be sampled only if it is waiting for the completion of some event or if the task has had control since the last interrupt. Because of the relative priority of various user's programs and of tasks within a program, any single task may have been inactive during the period following the last sample. This test is critical to the validity of the data collected because without it, unchanged operating conditions will be given improper weight. For each active task the operating system maintains one or more request blocks (RB) containing various control information corresponding to requests made by the task. One item in the last RB is the PSW which was stored the last time the task lost control and which will be used the next time the task gets control. The location of this last RB is in the TCB for the task. At Block 470 (sequence number 06050), the extractor program checks the old PSW stored in the last request block (RB) on the active queue for the task. If said RB shows that the task is in wait state, i.e., waiting for some event to occur, indication of this condition is stored in memory and the task will be sampled.

Otherwise, the extractor program tests for a particular bit pattern in the interrupt code of said PSW, namely, bits 16 through 18 all equal to 1. Said pattern was placed there by the extractor program when it last had control. Said pattern is not one of the patterns which would be in said PSW had the task been given control of the computer since the last time the extractor program had control. Therefore, by testing for said pattern, the extractor program can determine whether or not the task has been given control. This test is made at Block 480 (sequence number 06080). If the pattern is still present, this task will not be sampled. If not present, the pattern is then stored into said PSW for the test at the next time the extractor program gets control i.e., at the next sample (Block 490, sequence number 06100).

At Block 500 is one example of the kind of count the extractor program can keep, rather than record an actual operating condition. Here the extractor program counts the number of times at least one task passes the above tests during the sample (sequence number 06110).

At Block 510 a subroutine (RBADDR) is called to do the actual sampling of this task (sequence number 06160).

Upon return from the sampling subroutine a check is made to determine if any task remains to be sampled (Block 520, sequence number 06180). If there are more tasks, the extractor program repeats the test beginning at Block 460. If there are no more tasks, the extractor program again requests that it be placed in the wait state corresponding to the sample period, using STIMER (Block 530, sequence number 05930).

Figure 2D:
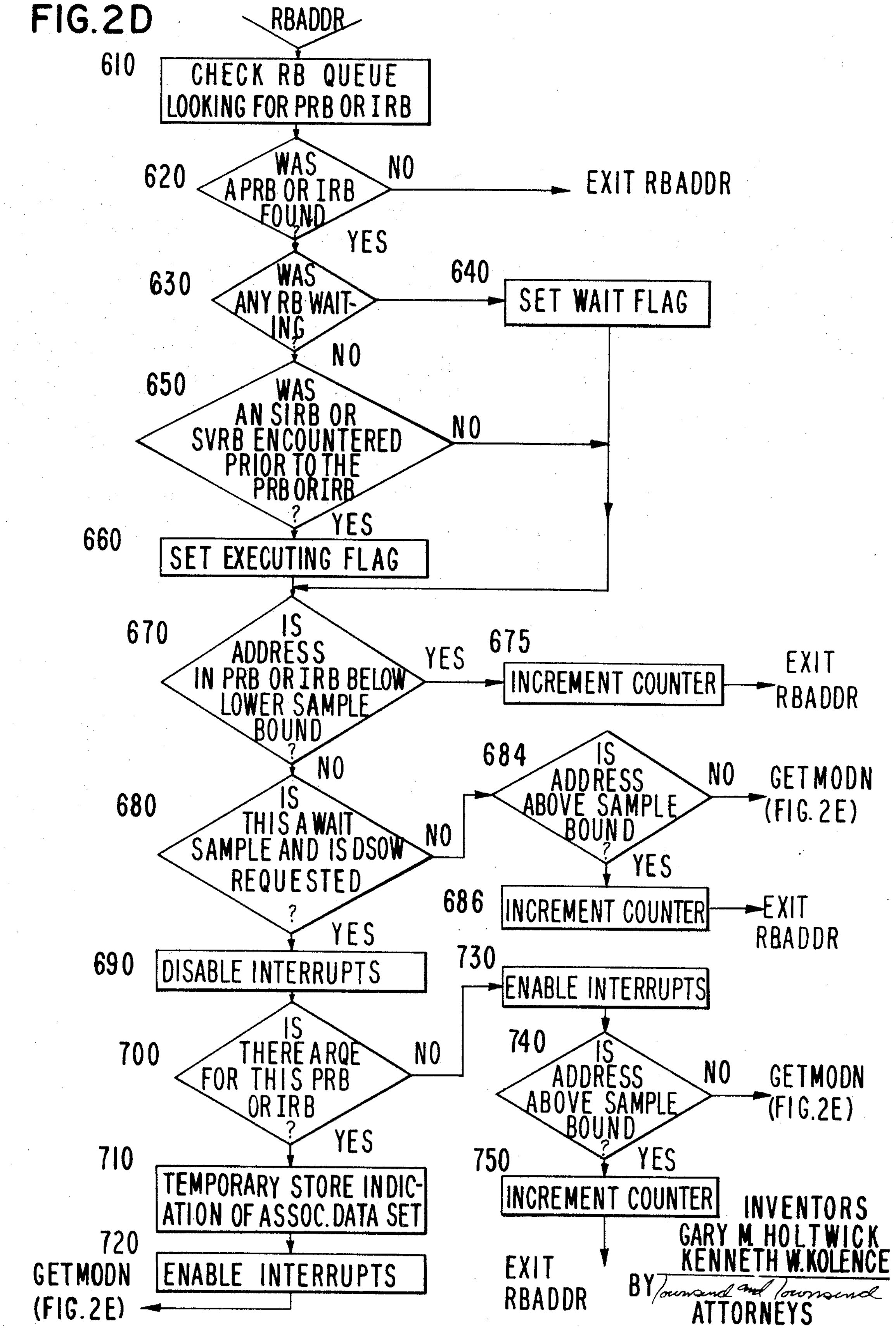

FIG. 2D is a flow chart of the sampling process for each eligible task. It is illustrative of the kind of sampling processes which can be performed. Being oriented toward a single problem program, the sampling process concentrates on those operating conditions which determine what each task was doing when it last had control. If interest were in the operating system as a whole, the sampling process would be concentrated on operating conditions indicative of usage of, for example, the devices of FIG. 1.

As mentioned above the operating system maintains tables of control information, called request blocks or RB's. There is one RB for each problem program task as well as RB's for various operating system initiated tasks associated with a problem program task. Additionally the user can provide exit routines to replace operating system routines normally executed at the completion of some system functions. The extractor program end-of-job routine is an example of such an exit routine. The RBs for each task are linked together and to the task's TCB. Therefore the extractor program can sample the operating conditions stored in each RB. Of particular interest is the PSW stored when the task associated with the RB was last in control of the computer because this PSW will indicate whether or not the associated task was waiting for some event and will give the memory location of the last instruction executed. There are four types of RB's:

Program Request Block (PRB)—used to control problem program tasks.

Interruption Request Block (IRB)—used to control operating system or user exit routines.

System Interruption Request Block (SIRB)—used to control operating system input/output error routines.

Supervisor Request Block (SVRB)—used to control certain operating system provided functions.

Upon entry to the sampling subroutine (RBADDR) the extractor program has already located the last RB in the chain for this task because it was used in the various tests of FIG. 2C. FIG. 2D deviates from the program listing which, of necessity, has numerous branches and loops beginning at sequence number 08220. Instead it presents the logic of this sector of the program in broad terms, leaving the details to the program listing.

At Block 610 the extractor program checks the active RB queue for the present task starting with the last entry and following the chain, if necessary, back to its end at the TCB. Checking stops when a program request block (PRB) or interruption request block (IRB) is found. If no PRB or IRB is found in said task's active RB queue, no operating conditions relating to said task are stored in memory and subroutine RBADDRR is exited (Block 620). At Block 630, the extractor program checks to determine if the PSW stored in any RB is in the wait state. If any RB is found to be waiting, this means said task is waiting and indication of this condition is stored in memory at Block 640 and processing continues at Block 670.

A Block 650 the extractor program checks to determine if a system interruption request block (SIRB) or supervisor request block (SVRB) is encountered before said PRB or said IRB is found, and if so, indication of this condition is stored in memory at block 660. This operating condition means some operating system routine task had control of the computer and said task is said to be "executing" rather than "actively computing" or waiting. At Block 670, the last executed instruction address contained in the old PSW of said PRB or said IRB is checked against the lower sample boundary (see discussion of Block 150 in FIG. 1). If said address is below the lower sample boundary, appropriate counters in memory to indicate "wait," or "executing" below lower sample bound incremented at Block 675 and processing for said task is complete.

Treatment of an address above the upper sample boundary depends on whether or not the wait flag is set (Block 640) and if so whether waiting is to be identified by data set (Block 290, FIG. 2A). This check is made at Block 680. If the wait flag is set and identification by data set is requested, processing continues at Block 690. Otherwise, the address in the PSW in the PRB or IRB is checked against the upper sample boundary, appropriate counters to indicate "wait," "active" or "executing" above upper sample boundary are incremented at Block 686 and processing for this task is complete. If it is less than the upper sample boundary, the extractor program branches to subroutine GETMODN (FIG. 2E) to process the address found in the PSW in the PRB or IRB.

If said PRB or said IRB is waiting and if input-output wait time is to be identified by data set, i.e., the test at Block 680 is satisfied, the extractor program traces through the UCB's and the logical channel queues searching for a request queue element (RQE) representing the input-output request for which said PRB or said IRB is waiting at said address. Earlier (Block 300, FIG. 2B) tables of pointers were constructed by the extractor to simplify access to the UCB's and the logical channel queues with the result that time spent in the extractor program is reduced. Due to the dynamic nature of the system control blocks involved in said search, the extractor program will disable itself against interrupts until said search is complete (sequence number 08480). Otherwise control could be temporarily taken from the extractor program by the operating system to complete processing of an input or output operation, possibly changing a table when it had only partly been processed by the extractor program. Again the details of the search are left to the program listing with no attempt made to flow chart the numerous branches and loops. Said search is done if said address is above the upper sample boundary in order to identify input-output requests issued indirectly by said task through system supplied access method routines.

As mentioned in connection with Block 300, FIG. 2B, the operating system maintains certain control information for each device in a UCB, and, if there is more than one logical unit assigned to a device (such as a channel-to-channel adaptor) in the logical channel queue. One item of control information is the address of the request queue element or table (RQE) containing details of, for example, which RB (request block) is referenced, which task made the input/output request and what data set is involved. Using its own tables of UCB and logical channel queue addresses, at Block 700 the extractor program searches the associated RQE's looking for the one referencing the PRB or IRB located at Block 620.

If no such RQE is found, processing continues at Block 730, i.e., the address is treated as if identification of wait by data set had not been requested. This can occur if the tables constructed at Block 290, FIG. 2B, were unable to accommodate all UCB and logical queue entries or with certain system oriented input/output. If the RQE is found, indication of the associated data set is temporarily stored in the form of a pointer into the table of data set names (TIOT) at Block 710 (sequence number 08970). Interrupts are then enabled (Block 720, sequence number 09040) and the extractor program branches to subroutine GETMODN (FIG. 2E) to process the address found in the PSW in the PRB or IRB, whether or not, as mentioned above, the address is above the upper sample boundary. If said search fails to find said RQE, the extractor program enables interrupts (Block 730, sequence number 09070) and then checks the address in the PSW in the PRB or IRB against the upper sample boundary (Block 740, sequence number 09090). If said address is above the upper sample boundary, appropriate counters in memory are incremented to indicate a wait above sample boundary at Block 750 (sequence number 09120) and processing for said task is complete. Otherwise the extractor program branches to subroutine GETMODN (FIG. 2E) to process the address found in the PSW in the PRB or IRB.

Before describing the processing of addresses within the sample boundaries, it is desirable to consider the potential structure of a task. The operating system (OS/MVT allows a problem program task to load one or more individual subroutines into the area of memory allocated to the task. Each such group of subroutines is called a "load module" and may be loaded over all or part of a load module already present. The group of subroutines first loaded when the task is initiated is also a load module. OS/MVT also allows a load module to overlay part of its own allocated area of memory with similar groups of subroutines, but these are still considered part of the load module. These latter groups are called "segments." While not all operating systems allow for the two layers of overlaying (load modules and segments), most operating systems have some provision for overlaying one portion of the problem program with another. For this reason, it is not enough for the extractor to simply obtain the instruction address in the PSW in the PRB or IRB.

For said address, the name and the absolute address boundaries of the load module containing said address at the time of the sample are determined by the extractor program. If the load module is further divided into segments, the segment occupying the area of memory containing the instruction must also be identified.

OS/MVT also allows segments within a load module to be gathered into regions to provide certain additional flexibility. The present embodiment of the extractor program will properly identify only segments loaded into the first such region.

In processing the instruction address, as detailed below, it is convenient for the extractor program to construct a table of load module names encountered and the address at which they begin (first word address) and end (last word address). Then in saving the module name in the sample data, an index to the table can be used, thus saving space.

Figure 2E:
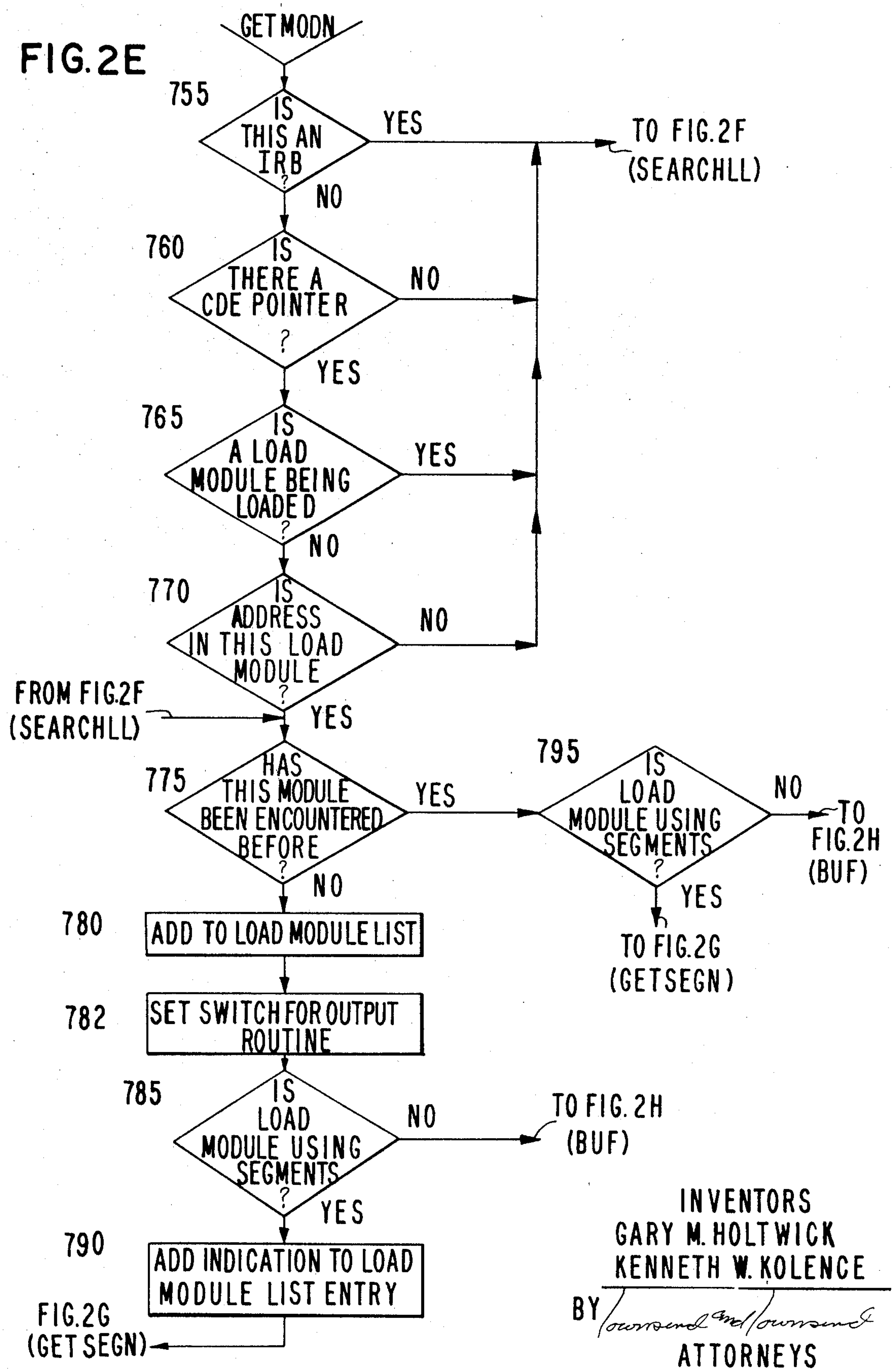

FIG. 2E is the flow chart of the routine (GETMODN) which locates the load module name. As described below, if a PRB is involved, it contains a pointer to a table entry, called the contents directors entry (CDE), where identification is found of the first load module loaded when that task was initiated. If this load module is not the correct one, any remaining PRB's in the RB chain and the list of load modules (load list) for this task, maintained by the operating system, are searched as described below.

At Block 755 the extractor programs determines if it is working with a PRB or IRB (sequence number 06350). If it is an IRB, it branches to search further (SEARCHLL, FIG. 2F). If it is a PRB for which the pointer to the contents directory entry (CDE) is zero as determined at Block 760 (sequence number 06370), the extractor program branches to SEARCHLL to search further. If there is a CDE pointer, the CDE is checked to determine whether the associated load module is currently being loaded (Block 765, sequence number 06410). If so, the extractor program branches to SEARCHLL to search further. Using the first word address of the load module and its length stored in the CDE, the extractor program determines if the load module address boundaries are such that said address is within said load module address boundaries (Block 770, sequence number 06430). If not, the extractor program branches to SEARCHLL to search further.

Figure 2F:
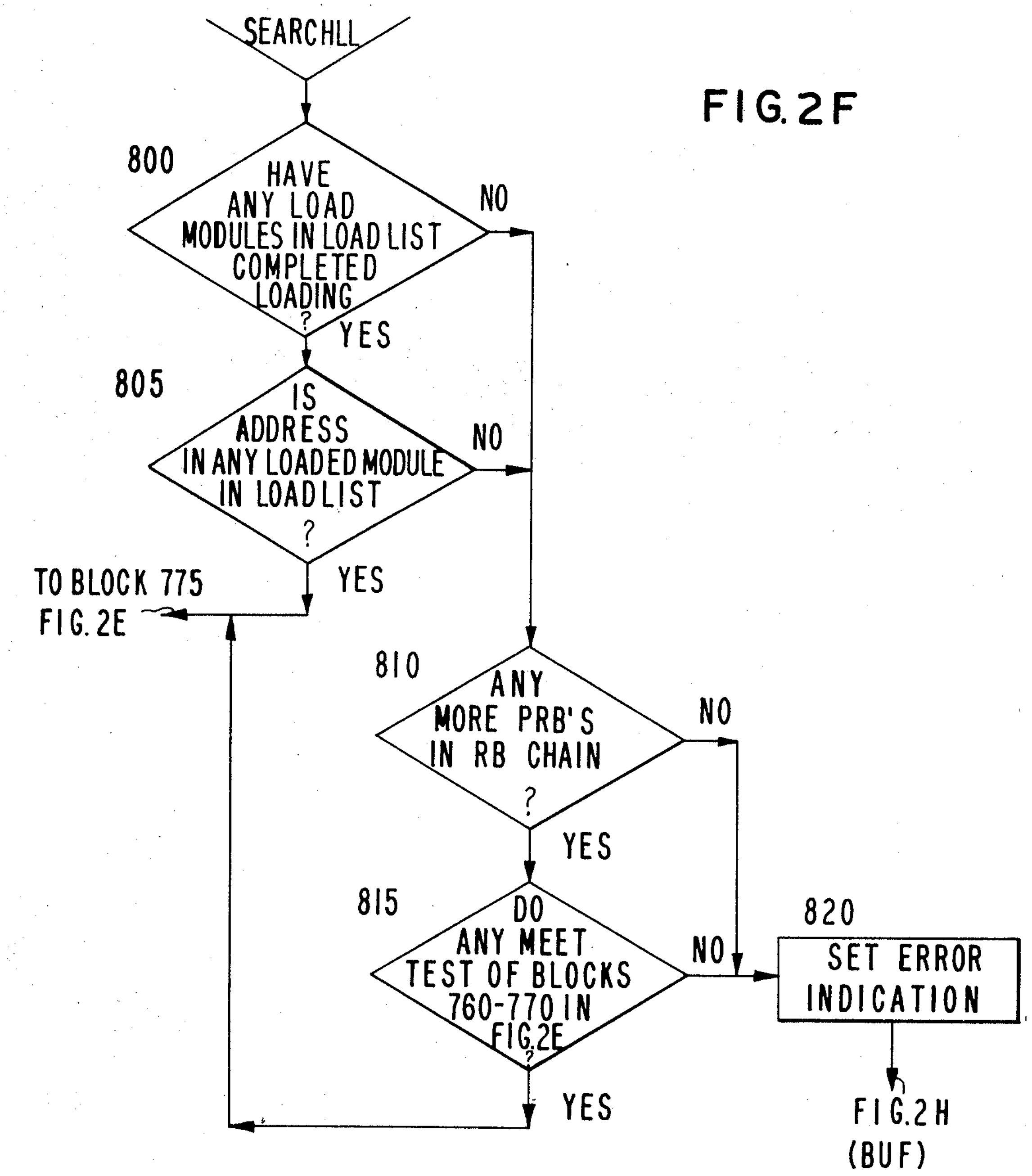

At Block 775, the extractor program checks to determine if this load module is in the list of load modules already encountered (sequence number 06510). The name is checked as well as the first word address because the load module could have been reloaded at a different memory location. Note that the extractor program returns to this block after having found the load module in SEARCHLL (FIG. 2F).

If the load module has not been encountered, the extractor program stores in its list the name of said load module and said load module address boundaries (Block 780, sequence number 06670). The list is of fixed size so that when there is not enough space for the new load module, an error indication will replace the normal sample data (not shown in the flow chart). At Block 782, a switch is set in the output routine (BUF, FIG. 2H) so that the new module name will be included in the sample data (sequence number 06870).

At Block 785, a check is made to determine if the load module is further divided into segments (sequence number 06920). This is done by checking the length of the block extent. If not exactly 16 bytes long, segments are being used. Explanation of the importance of this length is left to the appropriate IBM system manual but every operating system will require some indication of the presence of segments (or other type of overlay) and this indication can be checked by an extractor program. Note that if the scatter loading feature of OS/MVT is used, the test just described may not be valid and another test would have to be employed. If segments are being used, there will be a table of control information at the beginning of the load module and indication of the length of this table is added to the entry for this load module in the extractor program's load module list (Block 790, sequence number 06930). The extractor program then branches to find the segment number (GETSEGN, FIG. 2G). If segments are not being used, sampling of this task is complete and the sample data is saved in final form (BUF, FIG. 2H).

If the load module had already been encountered (Block 375), the previously stored indication, if any, is checked to determine if segments are being used (Block 795, sequence number 07110). If segments are being used, the extractor program branches to find the segment number (GETSEGN, FIG. 2G). Otherwise sampling of this task is complete and the sample data is saved in final form (BUF, FIG. 2H).

As mentioned in the initial discussion of FIG. 2E, if the load module name was not located through the CDE pointer in the PRB the extractor program searches the load list which represent routines that are brought into a job pack area or found in the link pack area by the contents supervision routines that perform the load function and if necessary any remaining PRB's in the RB chain. This is done by subroutine SEARCHLL as shown in FIG. 2F. Just as the PRB in the RB chain contained a pointer to a CDE for the associated load module, the load list entry includes such a point to a CDE. This CDE gives the load module name and its first and last word address.

At Block 800, the extractor program checks to determine if any load module in the load list has completed loading (sequence number 07780). (Again the details of the loop are omitted from the flow chart.) If so, at Block 805, the extractor program checks to determine if there is a load module in said load list for which the load module address boundaries are such that said address is within said load module address boundaries (sequence number 07810). If a match is found, the extractor program returns to Block 775 in FIG. 2E for processing this load module.

If said search of said load list fails, the extractor program tests any remaining PRB's on the active RB queue (Block 810, sequence number 07910). (Again details of the looping are not shown in the flow chart.) For each PRB, the checks in Blocks 760, 765 and 770 of FIG. 2E are made here by the extractor program to determine if the address in the PSW of the original PRB or IRB is within the load module address boundaries of the newly found PRB (Block 815, sequence number 07960). If these tests are met, the extractor program returns to Block 775 in FIG. 2E for processing this load module.

Figure 2G:
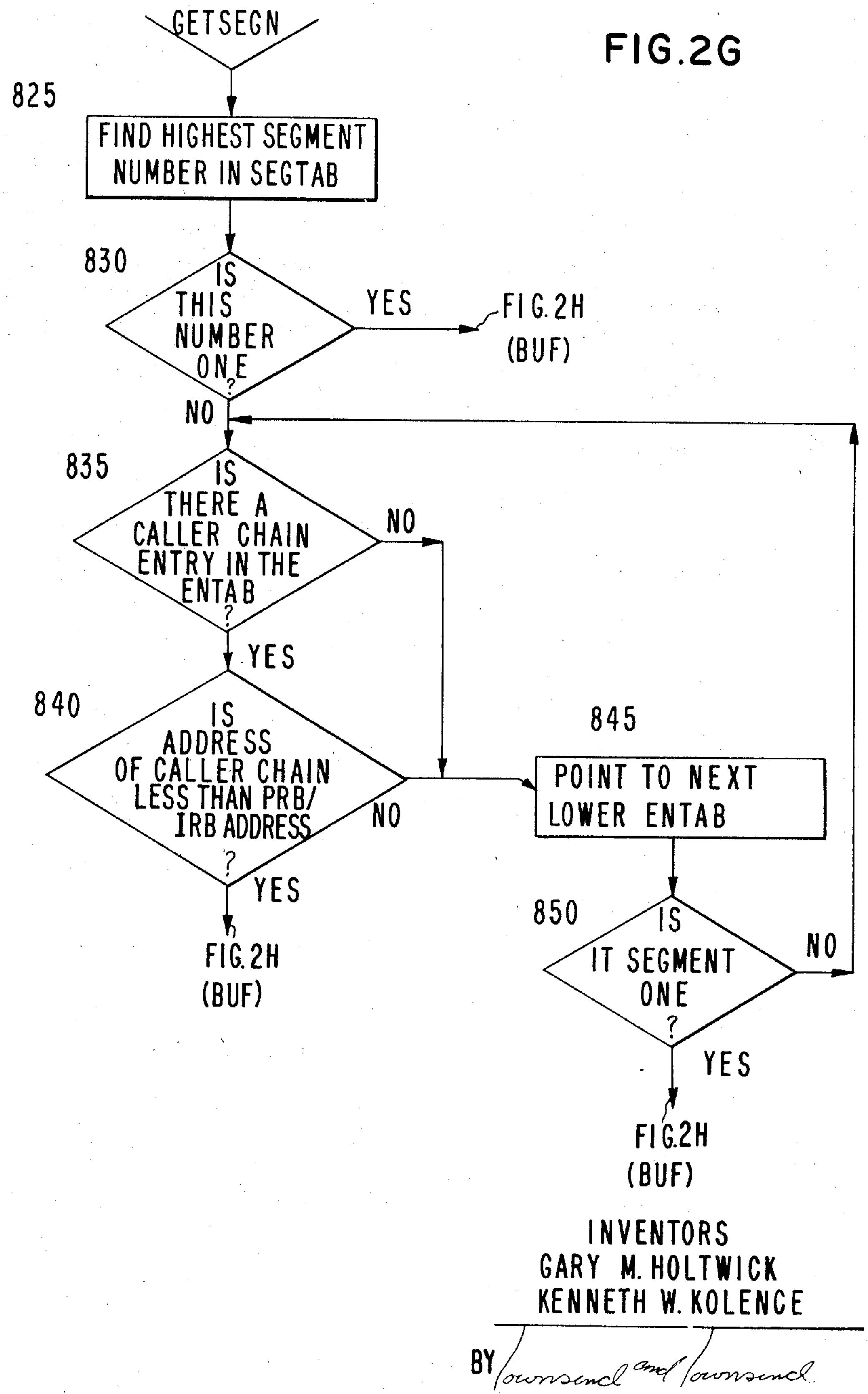
Figure 2H:
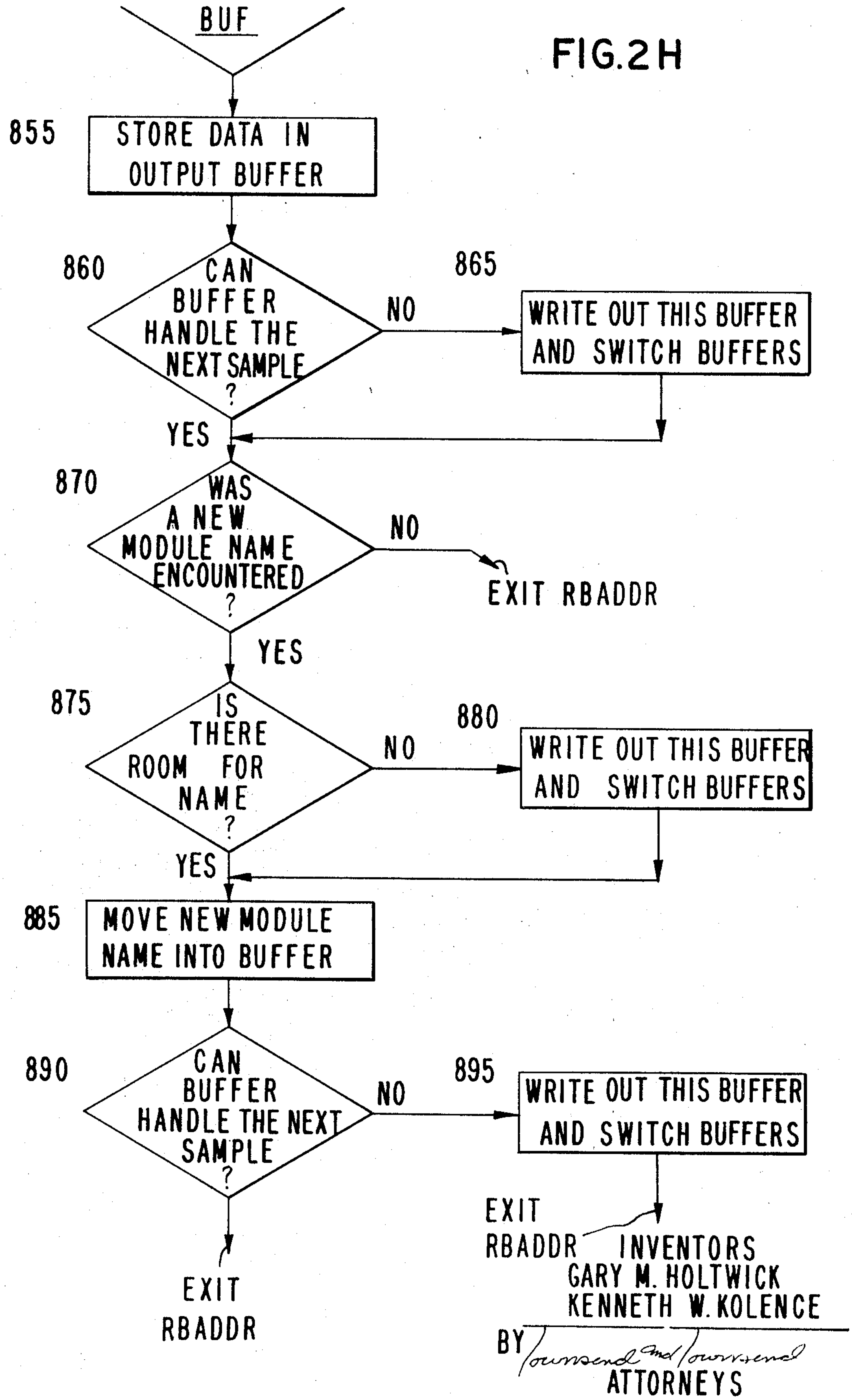

If said address is not within the load module address boundaries of any of said remaining PRB's, indication of this condition replaces the sample data for this task (Block 820, sequence number 08110) and the extractor program places this data in final form (BUF, FIG. 2H).

FIG. 2G is the flow chart of the subroutine in which the extractor program determines which segment of the load module contains the instruction from the PSW of the PRB or IRB. This subroutine is only entered when the extractor program has already determined that the load module is using segments (Blocks 785 and 795 of FIG. 2E).

As mentioned above, at the beginning of a load module using segments is a table of control information called the SEGTAB. At the end of every segment, except the last loaded, is a table of control information for that segment, called the ENTAB including the segment number, a pointer to the ENTAB of the segment which caused the loading of the segment associated with this ENTAB, or to the SEGTAB if this is segment number one, and control information used in transferring control from segment to segment. This latter is present if such control has been transferred from the associated segment to the next segment in memory and is called the "caller chain." The presence of such a caller chain entry for a segment indicates that the address could be in the following segment.

The extractor program tests the caller chain beginning with the highest segment number loaded in region one until a caller chain address is found which is less than said address from the PSW of the PRB of IRB.

The details of this process are shown in FIG. 2G. At Block 825 the extractor program determines the highest segment number by checking the SEGTAB (sequence number 09740). If this is segment 1, there is only one segment and sampling of this task is complete (Block 830, sequence number 09770). The sample data is then saved in final form (BUF, FIG. 2H).

Starting with the ENTAB just before the highest numbered segment, the extractor program checks for the existence of a caller chain (Block 835, sequence number 09940). If present the address of this caller chain is compared against the address from the PSW of the PRB or IRB (Block 840, sequence number 09980). If the latter is higher, the segment has been located and sampling of this task is complete.

The segment number corresponding to said caller chain address and said caller chain address are then saved in final form (BUF, FIG. 2H).

If there was no caller chain entry or the address from the PSW of the PRB or IRB was below the address of the caller chain entry, the extractor program moves to the ENTAB for the next lower segment (Block 845, sequence number 09310). If this next segment is number 1 (Block 850, sequence number 09810), there is no need to check further and sampling of this task is complete. The sample data is then saved in final form (BUF, FIG. 2H). Otherwise, the extractor program loops back to Block 835 to continue the search.

In FIG. 2H all of the information stored during this sample by the extractor program is gathered into a convenient form and stored ("blocked") with information stored earlier by the extractor program.

FIG. 2H is the flow chart for the subroutine (BUF) which puts the sample data for a task in final form and, if necessary, outputs the data to an external storage device. The approach used is a convenient one when a variable amount of data is collected in a sample. If a fixed amount of data, or a mixture of fixed and variable data is collected, different techniques familiar to a skilled programmer could be used. At Block 855, the various data collected for the current task is put in a convenient form and stored in the next available position in one of two areas of memory ("buffers") used to collect the data (sequence number 07200).

A test is made by the extractor program at Block 860 (sequence number 07310) to determine if the area in memory reserved for storage of said information has room for the information to be stored the next time the extractor program has control. If not, the current contents of said area are output to external storage device 23.

At Block 870 the extractor program checks to determine if a switch was set at Block 782, FIG. 2F to indicate that a new load module had been encountered (sequence number 07500). If not, processing, for this task is complete. If the switch is set, the extractor program checks to determine if there is sufficient room for the data associated with the new load module, in this embodiment the name and first and last word addresses (Block 875, sequence number 07520). If there is insufficient space, the extractor program requests the operating system to output the current buffer and the buffers are switched (Block 880, sequence number 07550). Then the data is moved into the buffer (Block 885, sequence number 07560). Again at block 890, the extractor program determines whether there will be space in the current buffer for the data for another task (sequence number 07620). If not the operating system is requested to output the current buffer and the buffers are switched (Block 895, sequence number 07640). Then processing for this task is complete.

Figure 2I:
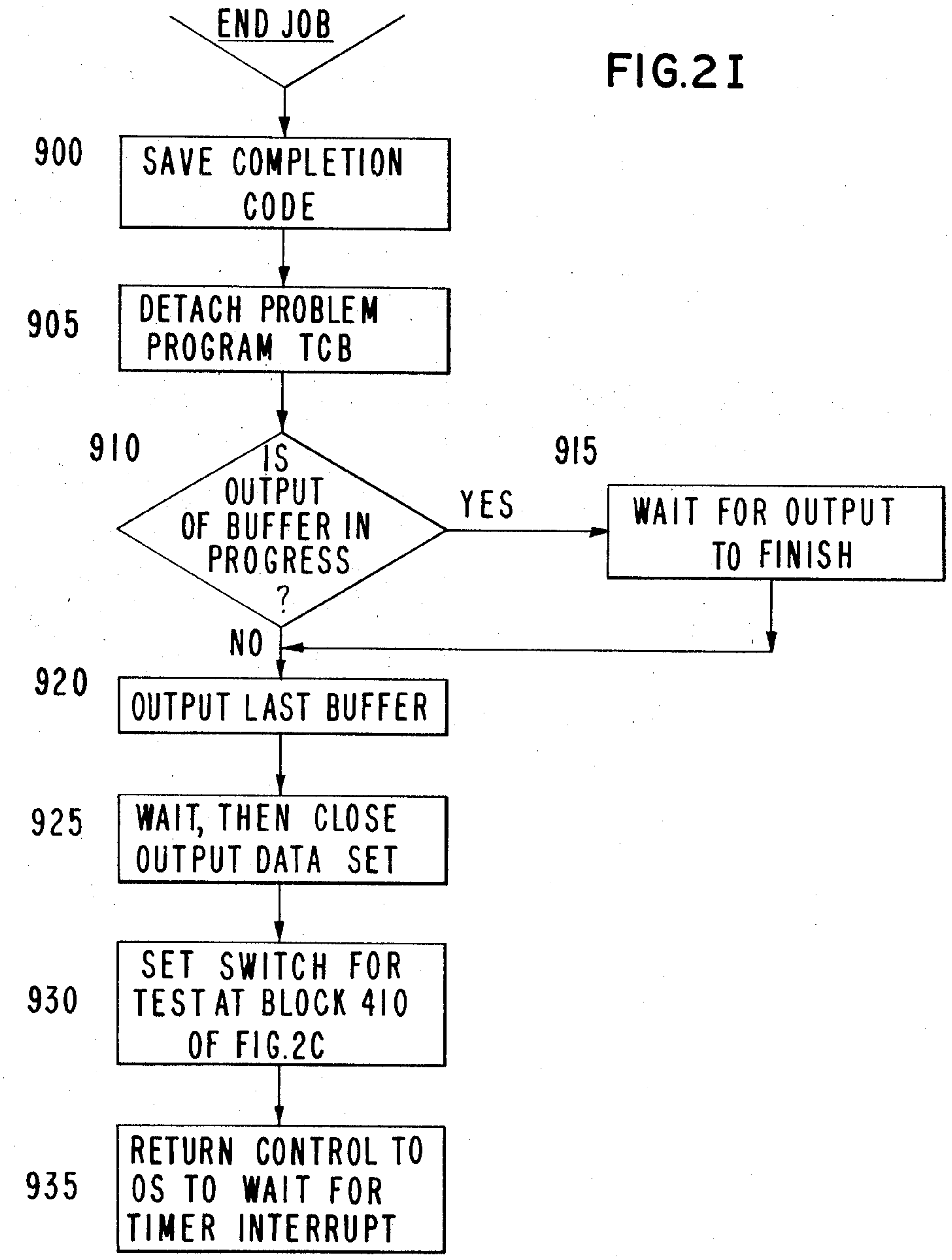

As discussed in connection with Block 310, in FIG. 2B, when the problem program was loaded at the request of the extractor program, the operating systems was instructed to return control to the extractor program's ENDJOB subroutine when the problem program terminated FIG. 2I is the flow chart of this subroutine.

At Block 900, the extractor program stores the termination status code ("completion code") set by the operating system for or at the instruction of the problem program (sequence number 05600). This code will have to be restored to the proper register when the extractor program finally terminates at Block 420 in FIG. 2C. At Block 905, the problem program TCB is released ("DETACH") to the operating system (sequence number 05610).

At Block 910, the extractor program checks to determine if the output of one of its buffers is in progress (sequence number 05630) and if so it waits at Block 915 (sequence number 05650).

At Block 920, any information remaining in said buffer is output to external storage device 23 (sequence number 5660). Then at Block 925, it waits for this output to finish and requests the operating systems to terminate its use of the output dataset ("CLOSE") (sequence number 05730).

The extractor program sets a switch at Block 930 to be tested at Block 410 in FIG. 2C (sequence number 05750). The extractor program then returns control at Block 935 to the operating system to wait for the time period associated with the sample rate to elapse (see Block 330 in FIG. 2B) (sequence number 05760). When this occurs the operating system will again give the extractor control at Block 410 in FIG. 2C where the switch set at Block 930 will be tested and the extractor program terminates.

Figure 3:
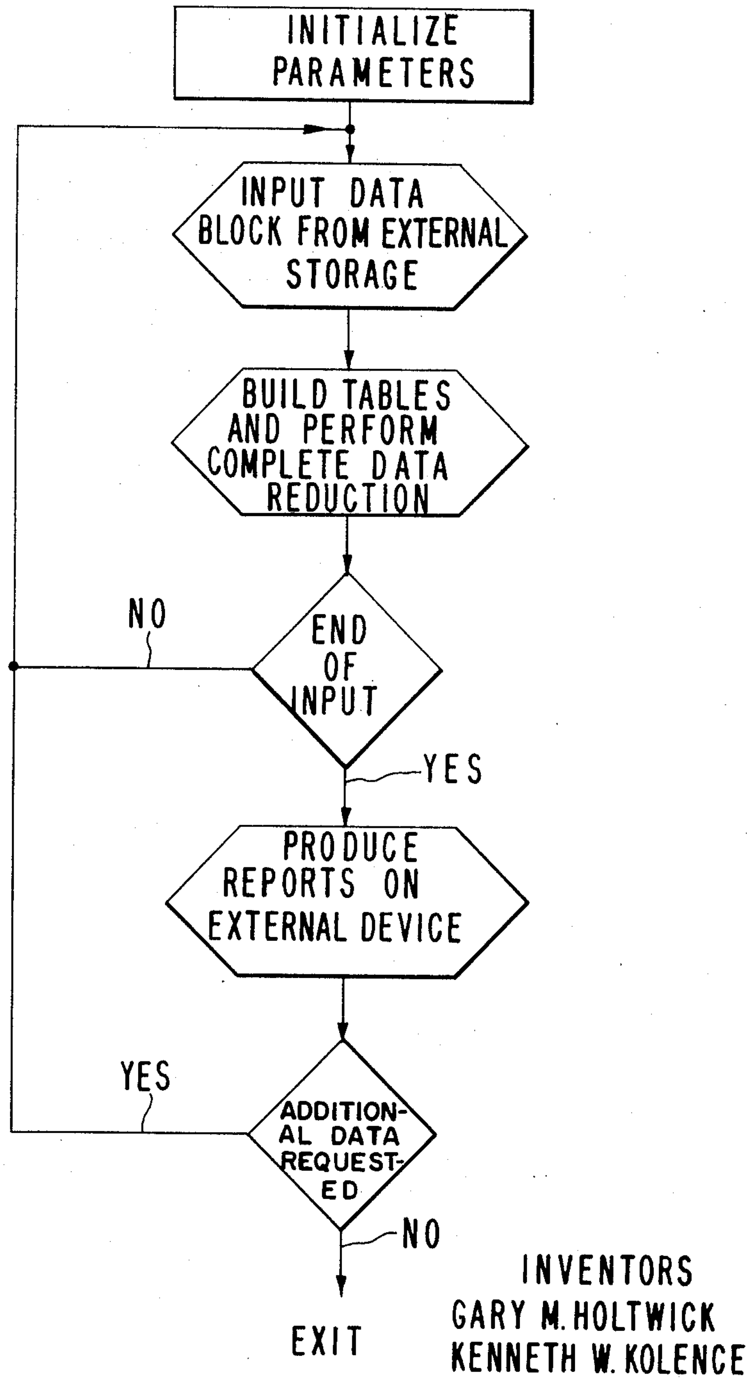
FIG. 3 is a flow chart representing in a broad sense an analyzer program usable with the present invention.

The analyzer program 25 operates in computer 10 to cause the latter to read the data into memory 12 from external storage device 23 and to arrange the data in a form which can be used by a programmer when the information is printed out. The printout of the information is in the form of a report which, to a programmer, reveals weak areas in the utilization of computer 10 so that the programmer can modify the problem program to better utilize the computer. The flow chart of FIG. 3 illustrates the carrying out of the method of the invention when the computer is under the control of analyzer program 25.

A typical example of an analyzer report is given hereinafter to show the type of tabulated information which is available to a programmer for use in determining whether or not the utilization of the computer is efficient and thereby whether or not the problem program must be revised to improve the utilization of the computer.

Produced by SMS/360 PPE-2A(2.0)/10ll
A Proprietary Program of
Boole and Babbage, Inc.
1121 San Antonio Road
Palo Alto, California 94304
415-961-4440

Code Efficiency Report

Analyst's name: George Boole
Location: Palo Alto, California

| | |
|---|---|
| Extractor Data Sets | |
| Data Set Name | FT04F001 |
| Job Name | OVLYPGM |
| Step Name | GO |
| Control Module Name | CUAN1 |
| Extraction | |
| Date | 26 May 69 |
| Start Time | 7.19.09 |
| End Time | 7.24.17 |
| Region Bounds (Absolute) | |
| FWA | 0A60000 |
| LWA | 0CB800 |
| Sample Bounds | |
| FWA | 000000 |
| LWA | 025800 |
| Sample Interval (MS) | 50 |
| Sample Counts | |
| Below FWA | 40 |
| In Bounds | 5990 |
| Above LWA | 88 |
| DSOW Wait | 48 |
| Sample Interrupts | |
| Including Wait | 6116 |
| Excluding Wait | 5490 |
| Total Interrupts | 6313 |
| Configuration ID | 65B |
| Extractor ID | PPE2E2.0 |
| Extractor Serial No. | 4 |

Distribution of Activity (Excluding DSOW Wait)

| | Active | Wait | Total |
|---|---|---|---|
| Below lower sample boundary | 0.18 | 0.47 | .065 |
| Within sample boundaries | 87.54 | 9.60 | 97.14 |
| Above upper sample boundary | 1.36 | 0.06 | 1.42 |
| Total | 89.08 | 10.13 | 99.21 |

Distribution of DSOW Wait

| Data set name | Percent of activity |
|---|---|
| SYSIN | 0.0 |
| SYSPRINT | 0.08 |
| SYSUTI | 0.70 |
| . | M |
| . | M |
| . | M |
| SYSABEND | 0.0 |
| Total | 0.79 |

Module Map

| Module name | First BYTE address | Last BYTE address | Percent of run time | Modules with overlays | Modules for which reports are provided |
|---|---|---|---|---|---|
| CUAN1 | 001DD8 | 01E000 | 73.15 | X | X |
| CUAN2 | 00E218 | 01E000 | 13.73 | X | |
| . | . | . | . | | |
| . | . | . | . | | |

Study Report for Module CUAN1
Segment Map

| Segment Number | Percent of Run Time | Segments for Which Reports are Provided |
|---|---|---|
| 1 | 31.20 | X |
| 2 | 0.73 | |
| 3 | 4.62 | |
| . | . | |
| . | . | |
| . | . | |

Study Report for Segment Number 1 of Module CUAN1

A. Bounds for the Study Report
Lower Bound: 000000
Upper Bound: 00E20F
Number of BYTES per Unit Interval: 112,00070 (HEX)

B. Distribution of Executed Instructions (Excluding DSOW Wait)

| | Active | Wait | Total |
|---|---|---|---|
| Below Lower Study Boundary | 0.0 | 0.0 | 0.0 |
| Within Study Boundaries | 20.82 | 9.60 | 30.42 |
| Above Upper Study Boundary | 0.0 | 9.0 | 0.0 |
| Total | 20.82 | 9.60 | 30.42 |

C. Percentage of Time Spent in DSOW Wait State: 0.78

| Data Set Name | Percent of Run Time |
|---|---|
| SYSIN | 0.0 |
| SYSPRINT | 0.08 |
| SYSUT1 | 0.70 |
| . | . |
| . | . |
| . | . |

D. Percentage of Time Spent in a Wait State (Excluding DSOW Wait): 9.60

| Location | Percent of Run Time |
|---|---|
| 000996 | 0.13 |
| 001742 | 0.10 |
| 004218 | 9.15 |
| . | . |
| . | . |
| . | . |

E. Percentage of Time Spent Executing SVC'S: 0.31

F. Specific Intervals Subreport (Excluding DSOW Wait)

| Starting Location | Ending Location | Percent of Run Time |
|---|---|---|
| 004210 | 00427F | 17.34 |
| 0041A0 | 00420F | 3.28 |
| . | . | . |
| . | . | . |
| . | . | . |

G. The Most Frequently Executed Intervals (Excluding DSOW Wait)

| Starting location | Ending location | Percent of run time |
|---|---|---|
| 004210 | 00427F | 17.34 |
| 00A480 | 00A4EF | 5.67 |
| 00A640 | 00A6AF | 3.28 |
| . | . | . |
| . | . | . |
| 005C50 | 005CBF | 0.34 |

column in this section is the ratio of samples taken within the load module to the total number of sample interrupts. Modules having overlays are noted in the next column of this section and the last column indicates those modules for which a Study Report is to be provided.

A Study Report is presented for each module requested, the Study Report in the example being given for the first module of the module map. If the module contains overlays, a summary of activity in each segment of the module is presented in the form of a segment map.

H. Code Execution Frequency for Each Interval (Ecxluding DSOW Wait Time)

| Starting location | Ending location | Interval percent | Cumulative percent | Histogram—percent of time (each*=0.4 percent) .0 4.0 8.0 12.0 16.0 20.0 |
|---|---|---|---|---|
| 000000 | 00053F | 0.0 | 0.0 | — |
| 000540 | 0005AF | 0.02 | 0.02 | — |
| . | . | . | . | |
| . | . | . | . | |
| 0041A0 | 00420F | 3.28 | 7.29 | —XXXXXXXX |
| 004210 | 00427F | 17.34 | 24.63 | —XXXXXXXXXXXXXXXXXXXXXXXXXXXXXXXXXXXXXXXXXXX |
| 004280 | 0042EF | 2.71 | 27.34 | —XXXXXX |
| . | . | . | . | |
| . | . | . | . | |
| 008D50 | 00A47F | 0.0 | 28.75 | — |
| 00A480 | 00A4EF | 1.67 | 30.42 | —XXXX |
| 00A4F0 | 00E29F | 0.0 | 30.42 | — |

NOTE.—The interval size consists of more then one unit interval.

In the above example, the first section summarizes some of the information about the particular problem program and the extractor program used therewith. The first item is the name associated with the information on the external storage device. The job name, step name and data are those of the extractor run which produced the information. The control module name is the name specified for the particular problem program. The start and end times are the wall clock times when the extraction was commenced and ended.

The region bounds are the absolute memory locations of the computer for the first word address and the last word address of the memory block occupied by the problem program. The sample bounds are the first word address and the last word address of the sample, both relative to the beginning of the region. The number of times the computer is interrupted when running the problem program is given as the total interruptions. At each of these interruptions, the extractor program determines if the problem program is waiting for the completion of some activity initiated by the problem program or if it has been active since the last interruption. Only then is a sample taken and the number of times this happens is given as the sample interrupts. The total is given as including wait. With multitasking, it is possible to get more than one sample per interruption because the extractor program treats each subtask as if it were a separate problem program. If the problem program does not use multitasking, the total sample interrupts will equal the total sample counts.

The configuration ID gives the designation of the machine configuration and operating system which was in effect during information extraction. The Extractor ID and Serial No. give the version and update of the extractor program and the unique extractor serial number for a particular installation.

The secton entitled Distribution of Activity presents a comparison of the activity of the computer within the sample boundaries to the total activity. This is done by giving the percentage of samples taken below, within and above the sample boundaries. The word "active" is defined as that percentage of activity when instructions are being executed within the area or by operating system routines including interruptible routines invoked within the area. The word "wait" is defined as that activity when the problem program must wait for some event associated with an activity within the area before it can resume processing within the area. As shown in the example, most of the sample time, namely, 98.72 percent was spent in the problem program.

The section entitled Module Map lists all load modules sampled by the extractor program. The addresses given are relative to the beginning of the region. The Percent of Run Tim- The Bounds for the Study Report are given as the minimum and maximum addresses relative to the beginning of the module to be considered for inclusion in the report.

The Distribution of Executed Instructions is a subreport similar to the above-mentioned Distribution of Activity except that it relates to the study bounds rather than the sample bounds to which the Distribution of Activity relates. This subreport shows the percent of total time spent within the study bounds, below the study bounds but within the module, and above the study bounds but still within the module. It is to be noted that the word "sample" is used to specify the portion of the problem to be sampled by the extractor program; whereas; the word "study" refers to the portion of the sample from which the analyzer program generates its report.

If any samples were taken while the problem program was waiting for an event, such as input-output completion, a subreport entitled Percentage of Time Spent in a Wait State gives a summary of this waiting. Only the time spent within the study bounds is reported. The subreport lists the locations within the study bounds relative to the beginning of the module at which the program entered the wait state and the percentage of the total run time which this represents.

The subreport entitled Percentage of Time Spent Executing SVC's was the percent of total run time identified as being spent by the module in execution of SVC's. This subreport has limited significance since many SVC's run with interrupts disabled.

In the subreport entitled Specific Intervals Subreport, the first two columns give the inclusive addresses to be reported on relative to the start of the module. Generally, a specific subreport of this type is not requested until a later analyzer run against the same extractor data. The third column gives the time spent in the interval as a percent of total run time.

The subreport entitled The Most Frequently Executed Intervals presents the 10 most frequently executed intervals in the study. The word "interval" refers to the histogram to be described. The first column gives the starting address of the interval and the second column provides an ending address, both relative to the start of the module. The third column gives the percentage of total run time spent in the associated interval.

The last subreport entitled Code Execution Frequency for Each Interval contains a histogram and presents the percentage of time spent in each interval whose size was given in the subreport, Bounds for Study Report. To the right of the four left-hand columns is the graphic representation of the percenttion is a horizontal histogram bar in which each mark represents a specified percentage of the total study time. The value of the mark is calculated so that the bar for the most time-consuming interval in all study reports nearly reaches the right margin.

APPENDIX A

```
* XXXX   XXXX    XXX   XXXX   XXXX   XXXXX  XXXXX  XXXXX   XXX   XXXX   X   X
* X   X  X   X  X   X  X   X  X   X    X    X        X    X   X  X   X  X   X
* X   X  X   X  X   X  X   X  X   X    X    X        X    X   X  X   X   X X
* XXXX   XXXX   X   X  XXXX   XXXX     X    XXXX     X    XXXXX  XXXX     X
* X      X X    X   X  X      X X      X    X        X    X   X  X X      X
* X      X  X   X   X  X      X  X     X    X        X    X   X  X  X     X
* X      X   X   XXX   X      X   X  XXXXX  XXXXX    X    X   X  X   X    X
*                                                                            00000100
*                                                                            00000110
*                              PROPERTY  OF                                  00000120
*                                                                            00000130
*                                                                            00000140
* XXXX    XXX    XXX   X      XXXXX                                          00000150
* X   X  X   X  X   X  X      X                                              00000160
* X   X  X   X  X   X  X      X                                              00000170
* XXXX   X   X  X   X  X      XXX                                            00000180
* X   X  X   X  X   X  X      X                                              00000190
* X   X  X   X  X   X  X   X  X                                              00000200
* XXXX    XXX    XXX   XXXXX  XXXXX                                          00000210
*                                                                            00000220
*                                                                            00000230
*                                                                            00000240
*   XXX                                                                      00000250
*  X   X                                                                     00000260
*  X   X                                                                     00000270
*   XXX                                                                      00000280
*  X X                                                                       00000290
* X   X X                                                                    00000300
* XXXXXX                                                                     00000310
*       X                                                                    00000320
*                                                                            00000330
*                                                                            00000340
*                                                                            00000350
* XXXX    XXX   XXXX   XXXX    XXX    XXX   XXXXX                            00000360
* X   X  X   X  X   X  X   X  X   X  X   X  X                                00000370
* X   X  X   X  X   X  X   X  X   X  X      X                                00000380
* XXXX   XXXXX  XXXX   XXXX   XXXXX  X  XX  XXX                              00000390
* X   X  X   X  X   X  X   X  X   X  X   X  X                                00000400
* X   X  X   X  X   X  X   X  X   X  X   X  X                                00000410
* XXXX   X   X  XXXX   XXXX   X   X   XXX   XXXXX                            00000420
*                                                                            00000430
```

Page 1

```
*                                                                            00000440
*                                                                            00000450
* XXXXX  XX    X   XXX                                                       00000460
*   X    XX    X  X   X                                                      00000470
*   X    X X   X  X                                                          00000480
*   X    X X   X  X                                                          00000490
*   X    X  X  X  X                                                          00000500
*   X    X   XX  X   X  XX                                                   00000510
* XXXXX  X    XX   XXX   XX                                                  00000520
         EJECT                                                               00000530
***************************************                                      00000540
***************************************                                      00000550
****   PPDEXT1 - LOAD MODULE 1    ****                                       00000560
****         FOR PPE-2E(1.1)      ****                                       00000570
***************************************                                      00000580
***************************************                                      00000590
PPDEXT1  CSECT                                                               00000600
         USING *,12                                                          00000610
         SAVE  (14,12)                                                       00000620
         LR    12,15                                                         00000630
         ST    13,SAVEAREA+4                                                 00000640
         LR    R9,13                                                         00000650
         LA    13,SAVEAREA                                                   00000660
         ST    13,8(R9)                                                      00000670
         LA    R0,32                                                         00000680
         GETMAIN R,LV=(0)                                                    00000690
         LR    R9,R1                                                         00000700
         USING MOD2CONS,9                                                    00000710
         MVC   CONFIG(28),SETCONS                                            00000720
         TITLE 'MAIN SCAN LOOP'                                              00000730
         OPEN  (PPDEXTIN,(INPUT),SYSOUT,(OUTPUT))                            00000740
         GET   PPDEXTIN                                                      00000750
         LA    R5,70(R1)        END OF RECORD                                00000760
         LR    R3,R1            START OF SCAN                                00000770
         MVI   FLAGC,0          CLEAR COMMA NOT FOUND FLAG                   00000780
         LA    R4,1             SET FIELD COUNTER TO 1                       00000790
TRT1     TRT   0(71,R1),COMMA SCAN FOR COMMA                                 00000800
         BC    8,BLK1           BR--NOT FOUND                                00000810
PREBLK   LR    R7,R1                                                         00000820
         LA    R6,1(R1)         START OF NEXT FIELD                          00000830
         SLR   R7,R3            CALC NEXT SCAN DISP                          00000840
         BC    2,BLK2           BR--FIELD EMPTY ,,                           00000850
         LR    R1,R3            START OF SCAN                                00000860
         STC   R7,TRT2+1        SET SCAN DISP IN TRT                         00000870
TRT2     TRT   0(0,R1),BLANKS SCAN OFF PREBLANKS                             00000880
         BC    2,BLK2           FIELD BLANK                                  00000890
         BC    8,BLK2                                                        00000900
         LR    R3,R1            START OF FIELD                               00000910
         LR    R1,R6                                                         00000920
         BCTR  R1,0                                                          00000930
         BCTR  R1,0                                                          00000940
         LR    R7,R1                                                         00000950
         SLR   R7,R3                                                         00000960
         LR    R8,R4            GET FIELD NO.                                00000970
         SLL   R8,2             X4                                           00000980
         L     R8,TYPE-4(R8)                                                 00000990
         BR    R8               BR TO PROCESS TYPE                           00001000
BLK1     LR    R1,R5            SET FIELD LIMITS                             00001010
         MVI   FLAGC,1          TURN ON COMMA NOT FOUND FLAG                 00001020
         B     PREBLK                                                        00001030
BLK2     LR    R8,R4            GET FIELD NO.                                00001040
```

Page 2

```
         SLL   R8,2             X4                                           00001050
         L     R8,BLANK-4(R8)                                                00001060
         MVI   FLDBLK,1         SET BLANK FIELD FLAG                         00001070
         BR    R8               BR TO PROCESS BLK FIELD                      00001080
         TITLE 'CHECK FIELDS FOR ERRORS'                                     00001090
ALPHAN   STC   R7,TRT3+1                                                     00001100
TRT3     TRT   0(0,R3),ALPHANU  CHECK FIELD FOR ALPHANUMERICS                00001110
CON1     BZ    OK1              FIELD OK                                     00001120
         CLI   0(R1),64         DOES FIELD CONTAIN TRAILING BLKS             00001130
         BNE   ERRORS           NO--BR                                       00001140
         BCTR  R1,0             CALC END OF FIELD                            00001150
OK1      LA    R15,1(R1)                                                     00001160
         ST    R15,R15SAVE                                                   00001170
         LR    R7,R1                                                         00001180
         SLR   R7,R3                                                         00001190
         LR    R8,R4                                                         00001200
         SLL   R8,2                                                          00001210
         L     R8,PROCESS-4(R8)                                              00001220
         BR    R8                                                            00001230
NUM      STC   R7,TRT4+1                                                     00001240
TRT4     TRT   0(0,R3),NUMERICS  CHECK FIELD FOR NUMERICS                    00001250
         B     CON1                                                          00001260
HEXN     STC   R7,TRT5+1                                                     00001270
TRT5     TRT   0(0,R3),HEXNUM    CHECK FIELD FOR HEXADECIMAL NUMBERS         00001280
         B     CON1                                                          00001290
ERRORS   MVI   STOP,1           SET STOP FLAG                                00001300
         STC   R4,FIELDN                                                     00001310
         OI    FIELDN,X'F0'                                                  00001320
         PUT   SYSOUT,CARDN                                                  00001330
DEFAULT  CLI   FLAGC,0          COMMA NOT FOUND                              00001340
         BNE   COMMANOT                                                      00001350
         LA    R4,1(R4)         BUMP FIELD COUNT                             00001360
         CL    R4,=FL4'7'       HAVE WE PROCESSED ALL FIELD                  00001370
         BC    10,FINISH                                                     00001380
         LR    R3,R6            ---                                          00001390
         LR    R1,R3            $                                            00001400
         LR    R7,R5            $                                            00001410
         SLR   R7,R3            $ RESET POINTERS & GO TO PROCESS             00001420
         STC   R7,TRT1+1        $  NEXT FIELD                                00001430
         MVI   FLDBLK,0                                                      00001440
         B     TRT1             ---                                          00001450
COMMANOT LR    R7,R5                                                         00001460
         CLI   FLDBLK,1                                                      00001470
         BE    FINISH                                                        00001480
         L     R1,R15SAVE                                                    00001490
         SLR   R7,R1                                                         00001500
         BC    2,FINISH                                                      00001510
         STC   R7,TRT6+1                                                     00001520
TRT6     TRT   0(0,R1),BLANKS                                   POI # 099    00001530
         BC    8,FINISH                                                      00001540
         PUT   SYSOUT,=CL50'*** COMMA MISSING OR ILLEGAL FIELD ***'          00001550
         B     EOV                                                           00001560
         TITLE 'PROCESS INDIVIDUAL FIELDS'                                   00001570
XMODN    CL    R7,=FL4'7'       FIELD 1 > 8 CHARACTERS                       00001580
         BH    ERRORS                                                        00001590
         STC   R7,MVC+1                                                      00001600
MVC      MVC   PGM(0),0(R3)                                                  00001610
         B     DEFAULT                                                       00001620
XCONFIG  CL    R7,=FL4'3'                                                    00001630
         BH    ERRORS                                                        00001640
         STC   R7,MVC1+1                                                     00001650
```

Page 3

```
MVC1     MVC   CONFIG(0),0(R3)                                               00001660
         B     DEFAULT                                                       00001670
XDSOW    CLC   0(4,R3),=CL4'DSOW'                                            00001680
         BNE   ERRORS                                                        00001690
         MVI   DSOWF,1                                                       00001700
         B     DEFAULT                                                       00001710
XINT     MVI   WBK,0                                                         00001720
         MVC   WBK+1(7),WBK                                                  00001730
         CL    R7,=FL4'2'       DOES FIELD EXCEED 3 CHAR                     00001740
         BP    ERRORS           YES--BR                                      00001750
         O     R7,=XL4'30'                                                   00001760
         STC   R7,PACK1+1                                                    00001770
PACK1    PACK  WBK+4(4),0(3,R3)                                              00001780
         CVB   R7,WBK                                                        00001790
         LTR   R7,R7                                                         00001800
         BZ    ERRORS                                                        00001810
         MH    R7,INTERVAL+2                                                 00001820
         ST    R7,INTERVAL                                                   00001830
         B     DEFAULT                                                       00001840
XFWA     CL    R7,=FL4'5'       DOES FIELD EXCEED 6 CHARS                    00001850
         BP    ERRORS                                                        00001860
         BAL   R10,HEXTOB                                                    00001870
         LTR   R11,R11                                                       00001880
         BZ    ERRORS                                                        00001890
         ST    R11,FWA                                                       00001900
         B     DEFAULT                                                       00001910
XLWA     CL    R7,=FL4'5'       DOES FIELD EXCEED 6 CHARS                    00001920
         BP    ERRORS                                                        00001930
         BAL   R10,HEXTOB                                                    00001940
         LTR   R11,R11                                                       00001950
         BZ    ERRORS                                                        00001960
         CL    R11,FWA                                                       00001970
         BNH   ERRORS                                                        00001980
         ST    R11,LWA                                                       00001990
         B     DEFAULT                                                       00002000
HEXTOB   SR    R11,R11                                                       00002010
         STC   R7,TR+1                                                       00002020
TR       TR    0(0,R3),EBCDTOH                                               00002030
         STC   R7,PACK2+1                                                    00002040
         OI    PACK2+1,48                                                    00002050
PACK2    PACK  WBK(4),0(0,R3)                                                00002060
         L     R11,WBK                                                       00002070
         SRL   R11,4                                                         00002080
         BR    R10                                                           00002090
FINISH   CLI   STOP,0                                                        00002100
         BE    RUN                                                           00002110
EOV      PUT   SYSOUT,=CL50' *** ERRORS OCCURRED ON INPUT DATA ***'          00002120
         CLOSE (PPDEXTIN,,SYSOUT)                                            00002130
         L     R13,SAVEAREA+4                                                00002140
         RETURN (14,12)                                                      00002150
RUN      CLOSE (PPDEXTIN,,SYSOUT)                                            00002160
         L     R13,SAVEAREA+4                                                00002170
         L     R14,12(13)                                                    00002180
         L     R1,24(13)                                                     00002190
         ST    R1,PARMFLD                                                    00002200
         LR    R1,R9                                                         00002210
         XCTL  (2,12),EP=PPDEXT2                                             00002220
         TITLE 'CONSTANTS'                                                   00002230
         CNOP  0,4                                                           00002240
PROCESS  DC    A(XMODN)                                                      00002250
         DC    A(XINT)                                                       00002260
```

Page 4

```
         DC    A(XDSOW)                                            00002270
         DC    A(XCONFIG)                                          00002280
         DC    A(XFWA)                                             00002290
         DC    A(XLWA)                                             00002300
TYPE     DC    A(ALPHAN)                                           00002310
         DC    A(NUM)                                              00002320
         DC    A(ALPHAN)                                           00002330
         DC    A(ALPHAN)                                           00002340
         DC    A(HEXN)                                             00002350
         DC    A(HEXN)                                             00002360
BLANK    DC    A(ERRORS)                                           00002370
         DC    A(DEFAULT)                                          00002380
         DC    A(DEFAULT)                                          00002390
         DC    A(DEFAULT)                                          00002400
         DC    A(DEFAULT)                                          00002410
         DC    A(DEFAULT)                                          00002420
PPDEXTIN DCB   BFALN=F,BFTEK=S,DSORG=PS,MACRF=GL,DDNAME=PPE2EIN1,  X00002430
               EODAD=EOV,RECFM=F,BLKSIZE=80                         00002440
SYSOUT   DCB   RECFM=F,BLKSIZE=50,DSORG=PS,DDNAME=PPE2EERR,MACRF=PM 00002450
************************************************************** 00002460
*  THE FOLLOWING ARE TRT & TR CONVERSION TABLES                * 00002470
************************************************************** 00002480
COMMA    DC    107FL1'0'                                           00002490
         DC    CL1','                                              00002500
         DC    148FL1'0'                                           00002510
BLANKS   DC    64FL1'1'                                            00002520
         DC    FL1'0'                                              00002530
         DC    191FL1'1'                                           00002540
ALPHANU  DC    193FL1'1'                                           00002550
         DC    9FL1'0'                                             00002560
         DC    7FL1'1'                                             00002570
         DC    9FL1'0'                                             00002580
         DC    8FL1'1'                                             00002590
         DC    8FL1'0'                                             00002600
         DC    6FL1'1'                                             00002610
         DC    10FL1'0'                                            00002620
         DC    6FL1'1'                                             00002630
NUMERICS DC    240FL1'1'                                           00002640
         DC    10FL1'0'                                            00002650
         DC    6FL1'1'                                             00002660
HEXNUM   DC    193FL1'1'                                           00002670
         DC    6FL1'0'                                             00002680
         DC    41FL1'1'                                            00002690
         DC    10FL1'0'                                            00002700
         DC    6FL1'1'                                             00002710
EBCDTOH  DC    193FL1'0'                                           00002720
         DC    XL6'0A0B0C0D0E0F'                                   00002730
         DC    42FL1'0'                                            00002740
         DC    XL9'010203040506070809'                             00002750
         CNOP  0,8                                                 00002760
WBK      DS    2F                                                  00002770
SAVEAREA DS    18F                                                 00002780
R15SAVE  DS    F                                                   00002790
SETCONS  DC    CL4'                                                00002800
         DC    XL4'27F'                                            00002810
         DC    FL4'0'                                              00002820
         DC    FL4'0'                                              00002830
         DC    CL8'                                                00002840
         DC    FL3'0'                                              00002850
         DC    FL1'0'                                              00002860
STOP     DC    FL1'0'                                              00002870
```

Page 5

```
FLAGC    DC    FL1'0'                                              00002880
CARDN    DC    CL12' *** FIELD  '                                  00002890
FIELDN   DC    CL38'0 OF CARD 1 ILLEGAL ***'                       00002900
FLDBLK   DC    FL1'0'                                              00002910
         LTORG                                                     00002920
         DS    2048FL1                                             00002930
         TITLE 'CONSTANTS TO BE PASSED TO PPDEXT2'                 00002940
MOD2CONS DSECT                                                     00002950
PARMFLD  DS    F                                                   00002960
CONFIG   DC    CL4'                                                00002970
INTERVAL DC    XL4'27F'                                            00002980
FWA      DC    FL4'0'                                              00002990
LWA      DC    FL4'0'                                              00003000
PGM      DC    CL8'                                                00003010
         DC    FL3'0'                                              00003020
DSOWF    DC    FL1'0'                                              00003030
R0       EQU   0              THESE                                00003040
R1       EQU   1                  ARE                              00003050
R2       EQU   2                    THE                            00003060
R3       EQU   3                      GENERAL                      00003070
R4       EQU   4                           REGISTER                00003080
R5       EQU   5                                EQUIVALENTS        00003090
R6       EQU   6                                                   00003100
R7       EQU   7                                                   00003110
R8       EQU   8                                                   00003120
R9       EQU   9                                                   00003130
R10      EQU   10                                                  00003140
R11      EQU   11                                                  00003150
R12      EQU   12                                                  00003160
R13      EQU   13                                                  00003170
R14      EQU   14                                                  00003180
R15      EQU   15                                                  00003190
         END                                                       00003200
         EJECT                                                     00003300
* XXXX   XXXX    XXX   XXXX   XXXX   XXXXX  XXXXX  XXXXX   XXX   XXXX   X   X
* X   X  X   X  X   X  X   X  X   X    X    X        X    X   X  X   X  X   X
* X   X  X   X  X   X  X   X  X   X    X    X        X    X   X  X   X  X   X
* XXXX   XXXX   X   X  XXXX   XXXX     X    XXXX     X    XXXXX  XXXX    X X
* X      X X    X   X  X      X X      X    X        X    X   X  X X      X
* X      X  X   X   X  X      X  X     X    X        X    X   X  X  X     X
* X      X   X   XXX   X      X   X  XXXXX  XXXXX    X    X   X  X   X    X
*                                                                  00012080
*                                                                  00012090
*                       PROPEPTY  OF                               00012100
*                                                                  00012110
*                                                                  00012120
* XXXX    XXX    XXX   X      XXXXX                                00012130
* X   X  X   X  X   X  X      X                                    00012140
* X   X  X   X  X   X  X      X                                    00012150
* XXXX   X   X  X   X  X      XXX                                  00012160
* X   X  X   X  X   X  X      X                                    00012170
* X   X  X   X  X   X  X   X  X                                    00012180
* XXXX    XXX    XXX   XXXXX  XXXXX                                00012190
*                                                                  00012200
*                                                                  00012210
*                                                                  00012220
*   XXX                                                            00012230
*  X   X                                                           00012240
*  X   X                                                           00012250
*   XXX                                                            00012260
*  X X                                                             00012270
```

Page 6

```
* X   X X                                                          00012280
* XXXXXX                                                           00012290
*       X                                                          00012300
*                                                                  00012310
*                                                                  00012320
*                                                                  00012330
* XXXX    XXX   XXXX   XXXX    XXX    XXX   XXXXX                  00012340
* X   X  X   X  X   X  X   X  X   X  X   X  X                      00012350
* X   X  X   X  X   X  X   X  X   X  X      X                      00012360
* XXXX   XXXXX  XXXX   XXXX   XXXXX  X  XX  XXX                    00012370
* X   X  X   X  X   X  X   X  X   X  X   X  X                      00012380
* X   X  X   X  X   X  X   X  X   X  X   X  X                      00012390
* XXXX   X   X  XXXX   XXXX   X   X   XXX   XXXXX                  00012400
*                                                                  00012410
*                                                                  00012420
*                                                                  00012430
* XXXXX  XX   X   XXX                                              00012440
*   X    XX   X  X   X                                             00012450
*   X    X X  X  X                                                 00012460
*   X    X X  X  X                                                 00012470
*   X    X  X X  X                                                 00012480
*   X    X   XX  X   X  XX                                         00012490
* XXXXX  X   XX   XXX   XX                                         00012500
         EJECT                                                     00003810
******************************                                     00003820
******************************                                     00003830
****                      ****                                     00003840
****   PPDEXT2 LOAD MODULE ****                                    00003850
****   2 FOR PPE-2F(1.1)   ****                                    00003860
****                      ****                                     00003870
******************************                                     00003880
******************************                                     00003890
PPDEXT2  CSECT                                                     00003900
         USING *,12,11                                             00003910
START    SAVE  (14,12)                                             00003920
         LR    12,15                                               00003930
         LA    11,4095(12)                                         00003940
         LA    11,1(11)                                            00003950
         ST    13,SAVEAREA+4                                       00003960
         LR    R9,13                  MFCS      8                  00003970
         LA    13,SAVEAREA            MFCS      8                  00003980
         ST    13,8(R9)               MFCS      8                  00003990
         USING MOD2CONS,3                                          00004000
         LR    3,1                                                 00004010
         LM    R4,R10,CONS                                         00004020
         ST    R4,HDRCFIG      PLACE CONFIG ID IN HEADER           00004030
         ST    R5,HDRINT       PLACE SAMPLE INTERVAL IN HEADER     00004040
         STM   R5,R10,SAMINT STORE CONSTANTS PASSED FROM MODULE 1  00004050
         L     R1,PARMFLD                                          00004060
         ST    R1,PARMFLD2                                         00004070
         STM   R8,R9,HDRCMN                                        00004080
         DROP  3                                                   00004090
         LR    1,3                                                 00004100
         FREEMAIN R,LV=32,A=(1)                                    00004110
         ST    R12,BASE                                            00004120
         OPEN  (PPDEXTO,OUTPUT)                                    00004130
         TITLE 'WRITE HEADER RECORD AND GET INTO SUPV MODE'        00004140
         L     R1,16           ADDR OF CVT                         00004150
         L     R2,140(R1)      GET ADDR OF LOG CHANNEL WORD TABLE  00004160
         ST    R2,CVTILCH      SAVE ADDR                           00004170
         L     R1,0(R1)        ADDR OF TCB POINTERS                00004180
```

Page 7

```
         L     R1,4(R1)        ADDR OF CURRENT TCB                 00004190
         LA    R1,0(R1)                                            00004200
         ST    R1,CRNTTCB      SAVE ADDR OF CURRENT TCB            00004210
         L     R2,12(R1)       ADDR OF TIOT                        00004220
         MVC   HDRJOBN(16),0(R2) PUT JOB NAME & STEP NAME IN HDR   00004230
         L     R2,24(R1)       LAST SPQE                           00004240
         L     R1,4(R2)        DQE FOR LAST SPQE                   00004250
         L     R1,8(R1)        BLOCK ADDR WHICH IS RFWA            00004260
         LA    R1,0(R1)        CLEAR HIGH ORDER BYTE               00004270
         ST    R1,HDRRFWA      PLACE RFWA IN HDR                   00004280
         AL    R1,FWA                                              00004290
         ST    R1,FWA          CALC ABSOLUTE ADDR FOR SAMPLE FWA   00004300
LOOPSPQE LR    R3,R2                                               00004310
         L     R2,0(R2)        GET NEXT SPQE ON QUEUE              00004320
         LA    R2,0(R2)                                            00004330
         LTR   R2,R2           LAST SPQE ON QUEUE                  00004340
         BNZ   LOOPSPQE        NO--BR                              00004350
         LR    R2,R3                                               00004360
         L     R3,4(R2)        DQE FOR SPQE                        00004370
         L     R1,8(R3)        BLOCK ADDR WHICH IS RLWA-BLOCK LENGTH 00004380
         LA    R1,0(R1)        CLEAR HIGH ORDER BYTE               00004390
         L     R2,12(R3)       GET BLOCK LENGTH                    00004400
         LA    R2,0(R2)        CLEAR HIGH ORDER BYTE               00004410
         ALR   R1,R2           CALC RLWA                           00004420
         ST    R1,HDRRLWA      PLACE RLWA IN HDR                   00004430
         L     R2,HDRRFWA                                          00004440
         CL    R1,FWA          FWA>RLWA                            00004450
         BNL   SKIPRSET        NO-BR                               00004460
         ST    R2,FWA                                              00004470
         ST    R1,LWA                                              00004480
         B     GO                                                  00004490
SKIPRSET EQU   *                                                   00004500
         AL    R2,LWA          CALC ABSOLUTE ADDR FOR SAMPLE LWA   00004510
         CLR   R2,R1                                               00004520
         BH    RESETBNS                                            00004530
         CL    R2,FWA                                              00004540
         BE    RESETBNS                                            00004550
         ST    R2,LWA                                              00004560
         B     GO                                                  00004570
RESETBNS ST    R1,LWA                                              00004580
GO       L     R1,FWA                                              00004590
         ST    R1,HDRFWA                                           00004600
         L     R1,LWA                                              00004610
         ST    R1,HDRLWA                                           00004620
         MVC   BUFFERO+5(1),DSOW                                   00004630
         TIME  DEC                                                 00004640
         ST    R0,HDRTIME                                          00004650
         ST    R1,HDRDATE                                          00004660
*     MOVE SYSDEB TO MY CORE $$$$$$$$$$$$$$$$$$$$$$$$$$$$$$$$$$$$$$ 00004670
         WTO   'PPE2F NO'                                              4671
         L     R1,PPDEXTO+44 GET ADDR OF DEB FROM DCB FOUNDATION BLOCK 00004680
         LA    R0,36                                               00004690
         ST    R1,SYSDEB       SAVE ADDR OF SYSTEM DEB             00004700
         SLR   R1,R0                                               00004710
         MVC   PPDEB(84),0(R1) MOVE SYSTEM DEB TO MY CORE          00004720
         LA    R1,MYDEB                                            00004730
         ST    R1,PPDEXTO+44 CHANGE DEB POINTER IN DCB TO POINT TO DEB 00004740
         LA    R1,SIOAPP       ADDR OF MY SIO APPENDAGE            00004750
         ST    R1,PPDEB+4      SET SIO APPENDAGE IN MY DEB         00004760
         LA    R1,PPDEB                                            00004770
         MVC   COMPCODE(1),MYDEB+28 SAVE XTNT SCALE                00004780
```

Page 8

```
         ST    R1,MYDEB+28     CHANGE I/O APPENDAGE VECTOR ADDR
         MVC   MYDEB+28(1),COMPCODE
*   WRITE OUT HEADER
         WRITE DECB,SF,,,,,,MF=F
         WAIT  ,ECB=DECB
*
*        WE SHOULD BE IN SUPERVISOR MODE NOW
*
         L     R1,SYSDEB       GET ADDR OF SYSTEM DEB
         ST    R1,PPDEXTO+44 RESET DCB TO POINT TO SYSTEM DEB
         WTO   'PPE2E OK'
         CLI   DECB,X'7F'
         BE    IOOK
         ABEND 68,DUMP
IOOK     EQU   *
         TITLE 'OUTPUT TIOT IF DSOW SELECTED'
         CLI   DSOW,C          REQUEST FOR DSOW
         BZ    ATTACH          NO--BR
         MVI   DSOWBR+1,0
         MVI   BUFFERO+4,2     SET RECORD TYPE
         SR    R2,R2           CLEAR REGISTER
         SR    R9,R9           CLEAR REGISTER
         SR    R8,R8           CLEAR REGISTER
         LA    R5,8            SET BUFFER INDEX
         L     R1,CRNTTCB      GET CURRENT TCB ADDR
         L     R1,12(R1)       GET TIOT ADDR
         LR    R7,R1           SAVE TIOT ADDR
         LA    R1,24(R1)       DISP TO 1ST DD ENTRY
NEXTDD   IC    R9,0(R1)        GET 1ST BYTE
         LTR   R9,R9           IS WORD ALL ZEROS
         BZ    ENDTIOT         YES--BR
         CLC   4(8,R1),=CL8'PPE2EDU2'
         BE    NOSTORE1
         CLC   4(8,R1),=CL8'PPE2EIN1'
         BE    NOSTORE1
         CLC   4(8,R1),=CL8'PPE2EFPR'
         BE    NOSTORE1
         LA    R5,12(R5)       BUMP BUFFER INDEX
         CL    R5,BUFMAX       BUFFER OVERFLOW Q.
         BH    DROPDD
         LR    R6,R1
         SLR   R6,R7             GET INDEX TO DDNAME
         ST    R6,BUFFERO-12(R5)  STORE INDEX TO DDNAME IN BUFFER
         LA    R6,BUFFERO-8(R5)
         CLC   4(8,R1),=CL8'         * BLANK DDNAME
         BNE   MVDDNAME        NO--BR
         MVC   0(8,R6),4(R10) YES--MOVE LAST NON-BLANK DDNAME
         B     STBLKSZ
MVDDNAME MVC   0(8,R6),4(R1) MOVE DDNAME TO BUFFER
         LR    R10,R1          SAVE ADDR OF DDNAME
STBLKSZ  STH   R5,BUFFERO      SET LOGICAL BLOCK SIZE
DROPDD   EQU   *
         IC    R2,2(R1)        GET NO. OF DEVICES
         LTR   R2,R2
         BZ    NOSTORE1
LOOPDVC  LR    R3,R7
         SLL   R3,2            MULT BY 4
         LH    R4,14(R1,R3)    GET DEVICE ENTRY
         LR    R15,R8          GET NO OF ENTRIES X 4
         SRL   R15,2           DIV BY 4
         LTR   R15,R15         NO ENTRIES
```

```
         BZ    STOREUCB        YES--BR
LOOPSRUC LR    R14,R15
         SLL   R14,2           MULT BY 4
         CL    R4,UCBADDR(R14)  THI UCB IN TABLE
         BE    NOSTORE
         BCT   R15,LOOPSRUC
STOREUCB ST    R4,UCBADDR+4(R8)     STORE IN TABLE
         LA    R8,4(R8)        BUMP TABLE INDEX
         CL    R8,=F'120'
         BH    ENDTIOT
NOSTORE  BCT   R2,LOOPDVC      BR IF MORE DEVICES
NOSTORE1 ALR   R1,R9
         B     NEXTDD
ENDTIOT  SRL   R8,2            DIV BY 4
         ST    R8,UCBADDR
         SR    R4,R4           CLEAR REGISTER
         LA    R6,LCHTAB       GET ADDR OF LCH TABLE
         L     R3,UCBADDR      GET NO. OF UCB ADDR S
LOOPUCB9 EQU   *
         SLL   R3,2            MULT BY 4
         L     R7,UCBADDR(R3) GET UCB ADDR
         LR    R5,R4           GET NO. OF LCH S
         LTR   R5,R5
         BZ    STORELCH
LOOPLCH9 EQU   *
         LA    R6,LCHTAB(R5)
         CLC   10(1,R7),0(R6) THIS LCH IN TABLE
         BE    LCHEQ
         BCT   R5,LOOPLCH9
STORELCH LA    R4,1(R4)        BUMP NO. OF LCH S
         LA    R6,LCHTAB(R4)
         MVC   0(1,R6),10(R7) ADD LCH TO TABLE
LCHEQ    SRL   R3,2            DIV BY 4
         BCT   R3,LOOPUCB9
         STC   R4,LCHTAB       STORE NO. OF LCH S
ATTACH   L     R1,PARMFLD2
         ATTACH EPLOC=PGM,LPMOD=1,DPMOD=-1,ETXR=ENDJOB
         LPSW  NPSW
         CNOP  0,8
NPSW     DC    XL4'FF040000'
         DC    A(ZEROKEY)
ZEROKEY  EQU   *
         L     R1,140(R1)      IQE FOR ETXR ROUTINE
         L     R1,8(R1)        ADDR OF IRB
         NI    17(R1),X'0F'     SET PROTECT KEY TO ZERO
         SR    R1,R1           CLEAR REGISTER
         LA    R2,0(R12)       ADDR OF 1ST BLOCK
         SSK   R1,R2           SET PROTECT KEY TO ZERO
         LA    R2,2048(R2)     GET 2ND BLOCK
         SSK   R1,R2           SET PROTECT KEY TO ZERO
         LA    R2,2048(R2)     GET 3RD BLOCK
         SSK   R1,R2           SET PROTECT KEY TO ZERO
         CLI   DSOW,0
         BZ    STARTPP
         WRITE DECB,SF,,,,,,MF=E
         CHECK DECB
         B     STARTPP
         CNOP  0,4
PARMFLD2 DS    F
         TITLE 'END OF JOB EXIT ROUTINE'
         USING *,15
```

```
ENDJOB   SAVE  (14,12)
         ST    13,SAVAREA+4
         LR    12,13
         LA    13,SAVAREA
         ST    13,8(12)
         L     R12,BASE
         LA    11,4095(12)
         LA    11,1(11)
         DROP  15
         USING START,12,11
         L     R6,16(1)
         ST    R6,COMPCODE
         ST    R1,TCB
         DETACH TCB
         CLI   CHECKIO+1,0
         BNZ   NOCKPEND
         CHECK DECB
NOCKPEND L     R6,BUFSWTCH
         SLL   R6,2
         L     R6,BUFO(R6)
         L     R1,CRNTTCB
         L     R1,0(R1)        IRB ADDR
         L     R1,60(R1)       GET REGISTER 7 FROM IRB
         ST    R1,4(R6)
         MVI   4(R6),3
         ST    R6,DECB+12      RESET ADDR OF BUFFER TO OUTPUT
         TIME  DEC
         ST    R0,SAMTIME(R6) PLACE TOD IN RECORD
         WRITE DECB,SF,,,,,,MF=F
         CHECK DECB
         CLOSE (PPDEXTO)
         MVI   JOBEND+1,240
         L     R13,SAVAREA+4
         RETURN (14,12)
         CNOP  0,4
TCB      DS    F
RETURN   L     R13,SAVEAREA+4
         L     R15,COMPCODE
         LM    0,12,20(13)
         L     14,12(13)
         BR    14
         TITLE 'MAIN LOOP'
STARTPP  EQU   *
         SR    R7,R7
         LA    R6,BUFFER1
TIMER    STIMER WAIT,TUINTVL=SAMINT
JOBEND   NOP   RETURN
         LA    R7,1(R7)
CHECKIO  B     NOCHECK
         CHECK DECB
         MVI   CHECKIO+1,240 TURN OFF CHECK I/O SWITCH
NOCHECK  EQU   *
         L     R1,CRNTTCB      GET ADDR OF MY TCB
LTCLOOP  LR    R2,R1
         L     R1,136(R2)      GET ADDR OF LTC
         LTR   R1,R1           ADDR=0 (NO SUBTASKS)
         BNZ   LTCLOOP         NO-BR
NTCLOOP1 EQU   *
         TM    33(R2),128      IS THIS TCB NONDISPATCHABLE
         BO    NEXTTCB
         L     R1,0(R2)        GET ADDR OF LAST RB ON ACTIVE QUEUE
```

```
         CLI   28(R1),0        RB WAITING
         BNZ   PATH
         TM    18(R1),224      DID THIS PGM RUN SINCE LAST SAMPLE
         BC    1,NEXTTCB       NO--BR-IGNORE SAMPLE FOR THIS TCB
         OI    18(R1),224      SET 3 HIGH ORDER BITS IN IC OF OPSW
PATH     NOP   SKBMPCT
         L     R10,SAMINTSC(R6) ---
         LA    R10,1(R10)        $ BUMP NO. OF INTERRUPTS WHICH SAMPLES
         ST    R10,SAMINTSC(R6) --- WHERE TAKEN SAMPLE
         MVI   PATH+1,240
SKBMPCT  BAL   R10,RBADDR      GO TO RB PROCESSING ROUTINE
NEXTTCB  EQU   *
         L     R1,128(R2)      GET ADDR OF NTC
         LTR   R1,R1           ADDR=0 (NO MORE SUBTASKS FOR OTC)
         BNZ   LTCLOOP         NO-BR
         L     R2,132(R2)      ADDR OF OTC FOR CURENT TASK
         CL    R2,CRNTTCB      HAVE WE PROCESSED ALL OF PPE S SUBTASKS
         BNE   NTCLOOP1        NO--BR
         MVI   PATH+1,0
         B     TIMER
         TITLE 'GET OBJECT MODULE NAME FOR CURRENT I-ADDR'
*        ENTRY
*        R10-RETURN ADDR
*        R1-ADDR OF PRB OR IRB
*        R2-CURRENT TCB
*        R8-I-ADDR               R0-FLAGS FOR I-ADDR
*        R6-CURRENT BUFFER ADDR
*
GETMODN  EQU   *
         TM    10(R1),64       THIS A IRB
         BO    SEARCHLL        YES--BR
         L     R3,12(R1)       GET ADDR OF CDE FOR THIS PRB
         LA    R3,0(R3)        CLEAR HIGH ORDER BYTE
         LTR   R3,R3           NO CDE FOR MODULE
         BZ    SEARCHLL        YES--BR
         TM    0(R3),64        MODULE BEING LOADED
         BO    SEARCHLL        YES--BR
         L     R4,20(R3)       NO--GET ADDR OF EXTENT LIST
         LR    R5,R8
         S     R5,12(R4)       SUB ADDR OF MAIN STORAGE BLOCK
         BL    SEARCHLL
         L     R15,8(R4)       GET LENGTH OF MAIN STORAGE BLOCK
         LA    R15,0(R15)      CLEAR HIGH ORDER BYTE
         CLR   R5,R15          DIFFERENCE LE LENGHT OF MAIN STORAGE BLK
         BH    SEARCHLL        NO--BR TO SEARCH LLS
LLSRT    LA    R14,MODTAB-16 ---
         L     R9,CRNTMOD      GET ADDR OF CURRENT MODULE
         CLC   0(8,R9),8(R3)   COMPARE MODULE NAMES
         BNE   NNOTEQ          NOT EQUAL--BR
         CLC   8(4,R9),12(R4)
         BE    FOUNDMOD
NNOTEQ   LA    R15,16          $ SET FOR SEARCH FOR THE
         LA    R9,LASTREC-16 $   MODULE NAME
         AL    R9,LASTREC      ---
LOOPSRM  CLC   0(8,R9),8(R3) COMPARE MODULE NAMES
         BNE   NOTEQ
         CLC   8(4,R9),12(R4) EQ-COMPARE EWA
         BE    FOUNDMOD
NOTEQ    SLR   R9,R15          ---
         CLR   R9,R14          $ HAVE WE SEARCHED THE COMPLETE TABLE
         BH    LOOPSRM         ---
```

```
         LA    R9,LASTREC     YES--NO MODULE FOUND
         L     R5,LASTREC
         CL    R5,MAXMOD
         BNL   BUF1
         ALR   R9,R5          CALC NEW MODULE TABLE ENTRY LOCATION
         ALR   R5,R15
         ST    R5,LASTREC
         MVC   0(8,R9),8(R3) PLACE MODULE NAME IN TABLE
         ST    R9,CRNTMOD     SAVE ADDR OF MODULE NAME IN PPE TABLE
        LR     R3,R9
         L     R5,12(R4)      GET ADDR OF MAIN STORAGE BLOCK
         ST    R5,8(R9)       PLACE FWA IN TABLE
         AL    R5,8(R4)       ADD LENGTH OF MAIN STORAGE BLOCK
         LA    R5,0(R5)       CLEAR HIGH ORDER BYTE
         ST    R5,12(R9)      PLACE LWA IN TABLE
         SLR   R9,R14         ---
         SRL   R9,4           ---CALC. ENTRY INDEX
         SLL   R9,24          SHIFT INDEX TO HIGH ORDER 8 BIT POSITION
         OR    R8,R9          MERGE ENTRY INDEX WITH I-ADDR & FLAGS
         SR    R9,R9          CLEAR REG.
         NI    NEWMODN+1,15
*
*        INSERT CODE TO SEE IF THIS MODULE IS DOING OVERLAYS
*
         CLC   0(4,R4),=F'16' BLOCK EXTENT LONGER THAN 16 BYTES
         BE    BUF            NO--BR
         L     R15,12(R4)     GET ADDR OF SEGTAB
         SR    R14,R14        CLEAR REGISTER
         IC    R14,8(R15)     HIGHEST SEG NO IN REGION 1
         SLL   R14,2          MULT BY 4
         LA    R14,31(R14)    LENGTH OF SEGTAB TO  NEXT DW BOUNDARY
         SRL   R14,3          DIV BY 8
         STC   R14,12(R3)     SET OVERLAY FLAG/WHICH IS ALSO LEHGTH
*                             OF SEGTAB
         B     GETSEGN
FOUNDMOD ST    R9,CRNTMOD     SAVE ADDR OF MODULE NAME IN PPE TABLE
        LR     R3,R9
         SLR   R9,R14         ---
         SRL   R9,4           ---CALC. ENTRY INDEX
         SLL   R9,24          SHIFT INDEX TO HIGH ORDER 8 BIT POSITION
         OR    R8,R9          MERGE ENTRY INDEX WITH I-ADDR & FLAGS
         CLI   12(R3),0       MODULE DOING OVERLAYS
         BNZ   GETSEGN
         TITLE 'BUFFER CONTROL'
*      ENTRY
*        R10-RETURN ADDR        R6-CURRENT BUFFER ADDR
*        R2-CURRENT TCB
*        R8-I-ADDR                  R0-FLAGS FOR I-ADDR
*        R9-SEGMENT DATA
*
BUF1     SR    R9,R9          CLEAR REGISTRE
BUF      LH    R3,0(R6)       RELATIVE ADDR OF NEXT BUFFER ENTRY
DSOWFND  B     DSOWSKP
         N     R9,=XL4'FF000000'  CLEAR LOW ORDER 3 BYTES
         MVI   DSOWFND+1,240      RESET BR SWITCH
DSOWSKP  EQU   *
         OR    R9,R0              MERGE IN DATA
         ST    R8,0(R3,R6)    ---
         ST    R9,4(R3,R6)    --- STORE DATA IN BUFFER
         LA    R3,8(R3)       BUMP RELATIVE ADDR
         LA    R9,NEWMODN     RETURN ADDR
```

```
         STH   R3,0(R6)       SET BUFFER LENGTH
         CL    R3,BUFMAX      BUFFER FULL
         BL    NEWMODN        NO--BR
WRITE    ST    R6,DECB+12     RESET ADDR OF BUFFER TO OUTPUT
         TIME  DEC
         ST    R0,SAMTIME(R6) PLACE TOD IN RECORD
         WRITE DECB,SF,,,,,,MF=F
         MVI   CHECKIO+1,0    SET CHECK I/O SWITCH
         LA    R1,1           ---
         SL    R1,BUFSWTCH    $ CALC. NEXT BUFFER
         ST    R1,BUFSWTCH    $
         SLL   R1,2           $
         L     R6,BUF0(R1)    --- GET ADDR OF NEXT BUFFER
         XC    12(28,R6),12(R6) CLEAR COUNTER AREA IN BUFFER
         LA    R3,40
         STH   R3,0(R6)
PASS1NOP BCR   0,R9           IF 1ST PASS THIS IS A NOP
         OI    PASS1NOP+1,240 SET NOP TO UNCONDITIONAL BR
         MVI   4(R6),3        SET RECORD TYPE
         BR    R9             RETURN
NEWMODN  BCR   15,R10         RETURN
         OI    NEWMODN+1,240
         LA    R4,16(R3)      BUMP RELATIVE ADDR
         CL    R4,BUFMAX      BUFFER FULL
         BNH   SKPWRT
         BAL   R9,WRITE       GO WRITE OUT BUFFER
SKPWRT   LA    R9,LASTREC-16
         AL    R9,LASTREC
         LA    R8,0(R3,R6)
         MVC   0(16,R8),0(R9) MOVE MODULE NAME TO BUFFER
         LA    R3,16(R3)      BUMP RELATIVE ADDR
         STH   R3,0(R6)       RESET BLOCK LENGTH
         CL    R3,BUFMAX
         BCR   4,R10
         LR    R9,R10
         B     WRITE
         TITLE 'SEARCH LOAD LIST FOR LOAD MODULE'
*      ENTRY
*        R10-RETURN ADDR
*        R1-ADDR OF PRB OR IRB
*        R2-CURRENT TCB
*        R8-I-ADDR                  R0-FLAGS FOR I-ADDR
*        R6-CURRENT BUFFER ADDR
*
SEARCHLL LR    R15,R1         SAVE ADDR OF LAST PRB OR IRB
         L     R1,36(R2)      ADDR OF LAST LLS ELEMENT
CONTLLS  LTR   R1,R1          END OF LLS
         BZ    ENDLLS         YES--BR
         L     R3,4(R1)       GET ADDR OF CDE
         TM    0(R3),64       MODULE BEING LOADED
         BO    GETNLLE        YES--BR
         L     R4,20(R3)      NO--GET ADDR OF EXTENT LIST
         LA    R5,0(R8)       CLEAR HIGH ORDER BYTE IN I-ADDR
         S     R5,12(R4)      SUB ADDR OF MAIN STORAGE BLOCK
         BL    GETNLLE
         L     R14,8(R4)      GET LENGTH OF MAIN STORAGE BLOCK
         LA    R14,0(R14)     CLEAR HIGH ORDER BYTE
         CLR   R5,R14         DIFFERENCE LE BLOCK LENGTH
         BC    12,LLSRT       YES--FOUND MODULE-GO TO PROCESS NAME
GETNLLE  L     R1,0(R1)       GET ADDR OF NEXT LLE
         B     CONTLLS
```

```
ENDLLS   TM    11(R15),128    LAST PRB ON ACTIVE QUEUE
         BC    1,NOMODFD      YES-BR
         L     R15,28(R15)    GET ADDR OF NEXT RB ON QUEUE
         TM    10(R15),192    THIS A PRB
         BNE   ENDLLS         NO-BR
         L     R3,12(R15)     GET ADDR OF CDE FOR THIS PRB
         LA    R3,0(R3)       CLEAR HIGH ORDER BYTE
         LTR   R3,R3          NO CDE FOR MODULE
         BZ    ENDLLS         YES--BR
         TM    0(R3),64       MODULE BEING LOADED
         BO    ENDLLS         YES--BR
         L     R4,20(R3)      NO--GET ADDR OF EXTENT LIST
         LR    R5,R8
         S     R5,12(R4)      SUB ADDR OF MAIN STORAGE BLOCK
         BL    ENDLLS
         L     R14,8(R4)      GET LENGTH OF MAIN STORAGE BLOCK
         LA    R14,0(R14)     CLEAR HIGH ORDER BYTE
         CLR   R5,R14         DIFFERENCE LE BLOCK LENGTH
         BH    ENDLLS         NO--BR GET NEXT PRB
         B     LLSRT          YES--FOUND MODULE--GO PROCESS NAME
NOMODFD  LA    R1,255         ---
         SLL   R1,24          $ MODULE CANNOT BE FOUND CONTAINING
         OR    R8,R1          $  THIS I-ADDR
         SR    R9,R9          $
         B     BUF            ---
         TITLE 'GET ADDRESS DATA'
*      ENTRY
*        R10-RETURN ADDR
*        R1-ADDR OF LAST RB IN RB QUEUE
*        R2-CURRENT TCB
*
RBADDR   MVI   WAIT,0         TURN OFF WAIT FLAG
         MVI   SVRB,0         TURN OFF SVRB FLAG
         SR    R0,R0          CLEAR REG.
RBCK1    CLI   28(R1),0       RB WAITING
         BE    NOWAIT         NO-BR
         MVI   WAIT,1         TURN ON WAIT FLAG
THISAPRB TM    10(R1),192     THIS A PRB
         BZ    PRB            YES--BR
         BO    SVRB1
         TM    10(R1),64      THIS AN IRB
         BO    PRB            YES--BR
SVRB1    EQU   *
         TM    11(R1),128     LAST RB ON ACTIVE QUEUE
         BCR   1,R10          YES--BR
GETNRB   L     R1,28(R1)      GET ADDR OF NEXT RB ON RB QUEUE
         B     RBCK1
PRB      L     R8,20(R1)      GET I-ADDR FROM OPSW IN PSB
         LA    R8,0(R8)       CLEAR HIGH ORDER BYTE
         CL    R8,FWA         I-ADDR .LT. FWA
         BL    WLTFWA         YES--BR
***********************************************************************
*        OBTAIN DATA SET ORIENTED I/O WAIT DATA                       *
***********************************************************************
DSOWBR   B     NODSOW
         CLI   28(R1),0       RB WAITING
         BZ    NODSOW         NO--SKIP DSOW
         SSM   DISABLE
         LR    R15,R8
         LA    R1,0(R1)       CLEAR HIGH ORDER BYTE OF RB ADDR
         L     R3,UCBADDR     GET NO. OF UCB ADDRESSES TO SEARCH
```

```
LOOPUCB  EQU   *
         SLL   R3,2           MULT BY 4
         L     R4,UCBADDR(R3)   GET UCB ADDR
         LH    R8,20(R4)      GET RQE
         LTR   R8,R8          DOES RQE EXIST
         BZ    LCH1           NO--BR
         L     R5,4(R8)       GET IOB ADDR FROM RQE
         LTR   R5,R5
         BM    NEXTRQE1       RQE ON FREE LIST
         L     R9,12(R8)      ADDR OF TCB FROM RQE
         LA    R9,0(R9)
         CLR   R9,R2          RQE BELONGS TO THIS TCB
         BNE   NEXTRQE1       NO--BR
         L     R5,4(R5)       ADDR OF ECB FROM IOB
         L     R5,0(R5)       GET ADDR OF RB FROM ECB
         LA    R5,0(R5)       CLEAR HIGH ORDER BYTE
         CLR   R5,R1          RB ADDR = ADDR OF WAITING RB
         BE    FOUNDECB       YES--BR
NEXTRQE1 EQU   *
         SRL   R3,2           DIV BY 4
         BCT   R3,LOOPUCB     GO GET ANOTHER UCB
LCH1     SR    R4,R4          CLEAR REGISTER
         IC    R4,LCHTAB      NO. OF LCH S
LCH      SR    R9,R9          CLEAR REGISTER
         IC    R9,LCHTAB(R4)  GET INDEX TO LCHTAB
         SLL   R9,3           MULT BY 8
         AL    R9,CVTILCH     ADD ADDR OF START OF TABLE
         LH    R8,0(R9)
         LTR   R8,R8
         BM    NEXTLCH
LOOPIOB  L     R5,4(R8)       GET IOB ADDR FROM RQE
         LTR   R5,R5
         BM    NEXTRQE        RQE ON FREE LIST
         L     R9,12(R8)      ADDR OF TCB FROM RQE
         LA    R9,0(R9)
         CLR   R9,R2          RQE BELONGS TO THIS TCB
         BNE   NEXTRQE        NO--BR
         L     R5,4(R5)       ADDR OF ECB FROM IOB
         L     R5,0(R5)       GET ADDR OF RB FROM ECB
         LA    R5,0(R5)       CLEAR HIGH ORDER BYTE
         CLR   R5,R1          RB ADDR = ADDR OF WAITING RB
         BE    FOUNDECB       YES--BR
NEXTRQE  EQU   *
         LH    R8,0(R8)       GET ADDR OF NEXT RQE
         LTR   R8,R8          LASTRQE
         BNM   LOOPIOB        NO--BR PROCESS RQE
NEXTLCH  BCT   R4,LCH
         B     ENDDSOW
FOUNDECB L     R4,8(R8)       GET ADDR OF DEB FROM RQE
         L     R5,24(R4)      GET ADDR OF DCB FROM DEB
         LH    R5,40(R5)      GET INDEX INTO TIOT
         MVI   DSOWFND+1,0    SET FLAG
         L     R0,DSOWFG
         OR    R0,R5
         LR    R8,R15
         SSM   ENABLE
         B     GETMODN
ENDDSOW  SSM   ENABLE
         LR    R8,R15         RESTORE REGISTER 8
NODSOW   EQU   *
         CL    R8,LWA         I-ADDR .GT. LWA
```

```
         BH    WGTLWA         YES--BR                                  00009100
         B     GETMODN        GET MODULE NAME CONTAINING THIS ADDR     00009110
WLTFWA   L     R9,SWLTFWA(R6) ---                                      00009120
         LA    R9,1(R9)        $ BUMP WAIT .LT. FWA COUNTER            00009130
         ST    R9,SWLTFWA(R6) ---                                      00009140
         BR    R10             RETURN                                  00009150
WGTLWA   L     R9,SWGTLWA(R6) ---                                      00009160
         LA    R9,1(R9)        $ BUMP WAIT .GT. LWA COUNTER            00009170
         ST    R9,SWGTLWA(R6) ---                                      00009180
         BR    R10             RETURN                                  00009190
NOWAIT   CLI   WAIT,0         WAIT FLAG ON                             00009200
         BNE   THISAPRB       YES--BR                                  00009210
         TM    10(R1),192     THIS A PRB                               00009220
         BZ    PRB2           YES--BR                                  00009230
         BO    SVRB2                                                   00009240
         TM    10(R1),64      THIS AN IRB                              00009250
         BO    PRB2           YES--BR                                  00009260
SVRB2    EQU   *                                                       00009270
         MVI   SVRB,1         SET FLAG                                 00009280
         L     R1,28(R1)      GET ADDR OF NEXT RB IN RB QUEUE          00009290
         B     RBCK1                                                   00009300
PRB2     EQU   *                                                       00009310
         L     R8,20(R1)      GET I-ADDR FROM OPSW IN PRB              00009320
         LA    R8,0(R8)       CLEAR HIGH ORDER BYTE                    00009330
         CL    R8,FWA         I-ADDR .LT. FWA                          00009340
         BL    ALTFWA         YES-BR                                   00009350
         CL    R8,LWA         I-ADDR .GT. LWA                          00009360
         BH    AGTLWA         YES-BR                                   00009370
         CLI   SVRB,0         IS THERE RB S BEFORE PRB                 00009380
         BNE   STEXE          YES--BR                                  00009390
         O     R0,ACTIVEFG    SET ACTIVE BIT                           00009400
         B     GETMODN        GO GET MODULE NAME                       00009410
STEXE    O     R0,EXECUTEF    SET EXECUTING BIT                        00009420
         B     GETMODN        GO GET MODULE NAME                       00009430
ALTFWA   CLI   SVRB,0                                                  00009440
         BNE   ELTFWA                                                  00009450
         L     R9,SALTFWA(R6) ---                                      00009460
         LA    R9,1(R9)        $ BUMP ACTIVE .LT. FWA COUNTER          00009470
         ST    R9,SALTFWA(R6) ---                                      00009480
         BR    R10             RETURN                                  00009490
ELTFWA   L     R9,SELTFWA(R6) ---                                      00009500
         LA    R9,1(R9)        $ BUMP EXECUTING .LT. FWA COUNTER       00009510
         ST    R9,SELTFWA(R6) ---                                      00009520
         BR    R10             RETURN                                  00009530
AGTLWA   CLI   SVRB,0                                                  00009540
         BNE   EGTLWA                                                  00009550
         L     R9,SAGTLWA(R6) ---                                      00009560
         LA    R9,1(R9)        $ BUMP ACTIVE .GT. LWA COUNTER          00009570
         ST    R9,SAGTLWA(R6) ---                                      00009580
         BR    R10             RETURN                                  00009590
EGTLWA   L     R9,SEGTLWA(R6) ---                                      00009600
         LA    R9,1(R9)        $ BUMP EXECUTING .GT. LWA COUNTER       00009610
         ST    R9,SEGTLWA(R6) ---                                      00009620
         BR    R10             RETURN                                  00009630
         TITLE 'GET SEGMENT NUMBER FOR THIS ADDRESS'                   00009640
*    ENTRY                                                             00009650
*      R10-RETURN ADDR         R4-BLOCK EXTENT LIST                    00009660
*      R1-ADDR OF PRB          R3-ADDR OF MODULE NAME IN PPE TABLE     00009670
*      R2-CURRENT TCB          R0-FLAGS FOR I-ADDR                     00009680
*      R9-I-ADDR                                                       00009690
*      R6-CURRENT BUFFER ADDR                                          00009700
```

```
*                                                                      00009710
*                                                                      00009720
GETSEGN  EQU   *                                                       00009730
         SR    R1,R1          CLEAR REG.                               00009740
         LA    R9,0(R9)                                                00009742
         L     R4,12(R4)      ADDR OF SEGTAB                           00009750
         IC    R1,9(R4)       GET HIGEST SEG. NO. IN REGION 1          00009760
         CL    R1,=FL4'1'     SEGMENT NO. = 1 (I.E. ROOT SEG.)         00009770
         BNE   NEQ1           BR--NO                                   00009780
         B     SEG1                                                    00009790
ROOT2N   SR    R1,R1                                                   00009800
         IC    R1,0(R14)      GET PREVIOUS SEG. NO.                    00009810
ROOT1    LTR   R1,R1          SEGMENT NO. = ZERO                       00009820
         BNZ   NEQ1           NO--BR                                   00009830
         LA    R1,1(R1)                                                00009840
SEG1     EQU   *                                                       00009850
         SL    R9,8(R3)       MAKE ADDR RELATIVE TO START OF SEG.      00009860
         SR    R4,R4          CLEAR REGISTER                           00009870
         IC    R4,12(R3)      GET LENGTH OF SEGTAB                     00009880
         SLL   R4,3                                                    00009890
         SLR   R9,R4          MAKE ADDR RELATIVE TO START OF SEGMENT   00009900
         SLL   R1,24          POSITION SEG. NO. TO HIGH ORDER BYTE     00009910
TOOMANY  OR    R9,R1          MERGE WITH ADDR                          00009920
         B     BUF            GO PLACE IN BUFFER                       00009930
NEQ1     SLL   R1,2           MULT. X 4                                00009940
         LA    R14,20(R4,R1)  ADDR.OF 4 WORD ENTRY FOR SEG. NO.        00009950
         TM    3(R14),3       CHECK FOR STATUS = ZERO                  00009960
         BNZ   ROOT2N         NO--BR                                   00009970
         L     R15,0(R14)     GET ADDR OF ENTAB ENTRY                  00009980
         LA    R15,0(R15)     CLEAR HIGH ORDER BYTE                    00009990
         CLR   R15,R9         ENTAB=I-ADDR                             00010010
         BH    ROOT2N                                                  00010020
         CL    R1,=FL4'1016' 254 SEG.X4                                00010030
         BNH   USESEG                                                  00010040
         L     R1,=X'FEC00000' ERROR --TOO MANY SEGMENTS               00010050
         B     TOOMANY                                                 00010060
USESEG   AH    R15,2(R15)     ADD DISP TO END OF ENTAB TO ENTAB ENTRY AD 00010070
         LA    R15,17(R15) ADD 7 BYTES TO GET  ON DW BOUNDARY          00010080
         N     R15,=X'FFFFFFF8' CLEAR 3 LOW ORDER BITS                 00010090
         SRL   R1,2           GET BACK SEG. NO.                        00010100
         SLR   R9,R15         SUBTRACT START OF SEGMENT                00010120
         SLL   R1,24          POSITION SEGMENT NO TO HIGH ORDER BYTE   00010130
         OR    R9,R1          MERGE WITH ADDR                          00010140
         B     BUF                                                     00010150
         TITLE 'SIO APPENDAGE USED TO GET IN SUPV MODE'                00010160
*********************************************************************** 00010170
*        THIS APPENDAGE IS USED TO PLACE PPDEXT2 PRB IN SUPERVISOR    * 00010180
*         MODE. THIS TECHNIQUE WILL NOT WORK FOR 360 S WITH FETCH     * 00010190
*         PROTECTION                                                  * 00010200
*********************************************************************** 00010210
         DROP  12,11                                                   00010220
         USING *,15                                                    00010230
SIOAPP   L     10,12(1)       GET TCB ADDR                             00010240
         L     10,0(10)       ADDR OF PRB                              00010250
         CLI   28(10),0       IS PRB WAITING                           00010260
         BNE   RBPSW          YES-BR                                      10270
         CLC   33(1,0),17(10)                                             10271
         BE    SIOSVC                                                     10272
RBPSW    EQU   *                                                          10274
         NI    17(10),254     YES-CHANGE PSW IN  PR                    00010280
**********************************************-PP MODE BIT OFF         00010290
```

```
         BR    14             RETURN-       OUTPUT RECORD              00010300
SIOSVC   NI    33,254         CHANGE PSW IN SVC OPSW                   00010310
**********************************************-PP MODE BIT OFF         00010320
         BR    14             RETURN-       OUTPUT RECORD              00010330
         DROP  15                                                      00010340
         USING PPDEXT2,12,11                                           00010350
         TITLE 'CONSTANTS'                                             00010360
         CNOP  0,8                                                     00010370
BUFFER0  DC    FL2'76'                                                 00010380
         DS    FL2                                                     00010390
         DC    FL1'1'                                                  00010400
         DS    FL3                                                     00010410
         DS    13FL4                                                   00010420
         DC    CL16'    PPE2E1.1   0'                                  00010430
         DS    109F                                                    00010440
BUFFER1  DC    FL2'40'                                                 00010450
         DS    FL2                                                     00010460
         DC    FL1'3'                                                  00010470
         DS    FL3                                                     00010480
         DS    FL4                                                     00010490
         DC    7FL4'0'                                                 00010500
         DS    118FL4                                                  00010510
BUF0     DC    A(BUFFER0)                                              00010520
         DC    A(BUFFER1)                                              00010530
BUFSWTCH DC    FL4'1'                                                  00010540
CCMPCODE DS    F                                                       00010550
MAXMOD   DC    FL4'1932'                                               00010560
PPDEB    DS    9F                                                      00010570
MYDEB    DS    12F                                                     00010580
SYSDEB   DS    F                                                       00010590
CVTILCH  DS    F                                                       00010600
CRNTTCB  DS    F                                                       00010610
CRNTMOD  DC    A(MODTAB)                                               00010620
SAMINT   DS    F                                                       00010630
FWA      DS    F                                                       00010640
LWA      DS    F                                                       00010650
PGM      DS    CL8                                                     00010660
         DS    CL3                                                     00010670
DSOW     DS    CL1                                                     00010680
ACTIVEFG DC    XL4'00400000'                                           00010690
EXECUTEF DC    XL4'00800000'                                           00010700
DSOWFG   DC    XL4'00C00000'                                           00010710
SAVAREA  DS    18F                                                     00010720
BUFMAX   DC    F'512'                                                  00010730
SAVEAREA DS    18F                                                     00010740
BASE     DS    F                                                       00010750
LASTREC  DC    2F'12'                                                  00010760
TRYTIME  DS    F                                                       00010770
MODTAB   DS    480F                                                    00010780
UCBADDR  DS    31F                                                     00010790
LCHTAB   DS    31CL1                                                   00010792
         CNOP  0,4                                                     00010800
         WRITE  DECB,SF,PPDEXT0,BUFFER0,'S',MF=L                       00010810
PPDEXT0  DCB   RECFM=D,BLKSIZE=512,DDNAME=PPE2EDU2,DSORG=PS,MACRF=W,  X00010820
               RECFM=F                                                 00010830
SVRB     DS    FL1                                                     00010840
WAIT     DS    FL1                                                     00010850
DISABLE  DC    FL2'255'                                                00010860
ENABLE   EQU   DISABLE+1                                               00010870
         LTORG                                                         00010880
         ORG   START+6144                                              00010890
```

```
         TITLE 'CONSTANTS PASSED FROM PPDEXT1'                         00010900
MOD2CONS DSECT                                                         00010910
PARMFLD  DS    F                                                       00010920
CONS     DC    CL4'    '                                               00010930
         DC    XL4'27F'                                                00010940
         DC    FL4'0'                                                  00010950
         DC    FL4'0'                                                  00010960
         DC    CL8'        '                                           00010970
         DC    FL3'0'                                                  00010980
         DC    FL1'0'                                                  00010990
         TITLE 'OUTPUT BLOCKS FOR PPE/MVT'                             00011000
*              DEC    /<----------- 4 BYTES ---------->/               00011010
*                     ***********************************              00011020
* HORLGTH      0      * BLOCK LENGTH   /  NOT USED      *              00011030
*                     ***********************************              00011040
* HORRTYP      4      *REC TYP / Z)   /   NOT USED      * REC TYP = 1  00011050
*                     ***********************************              00011060
* HORTIME      8      *          TIME (DEC)             *              00011070
*                     ***********************************              00011080
* HORDATE      12     *          DATE (DEC)             *              00011090
*                     ***********************************              00011100
* HORINT       16     *      SAMPLE INTERVAL            *              00011110
*                     ***********************************              00011120
* HORJOBN      20     *         JOB NAME                *              00011130
*                     ***********************************              00011140
* HORSTEPN     28     *         STEP NAME               *              00011150
*                     ***********************************              00011160
* HORCMN       36     *     CONTROL MODULE NAME         *              00011170
*                     ***********************************              00011180
* HORFWA       44     *              FWA                *              00011190
*                     ***********************************              00011200
* HORPFWA      48     *              PFWA               *              00011210
*                     ***********************************              00011220
* HORLWA       52     *              LWA                *              00011230
*                     ***********************************              00011240
* HORRLWA      56     *              RLWA               *              00011250
*                     ***********************************              00011260
* HORCFIG      60     *           CONFIG ID             *              00011270
*                     ***********************************              00011280
* HOREXTID     64     *          EXTRACTOR ID           *              00011290
*                     ***********************************              00011300
*              72     *          SERIAL NO.             *              00011310
*                     *                                 *              00011320
*                     ***********************************              00011330
*                     *    .                            *              00011340
*                     *    .                            *              00011350
*                     *    .                            *              00011360
*                     ***********************************              00011370
*              NNN    *          NOT USED               *              00011380
*                     ***********************************              00011390
         EJECT                                                         00011400
*              DEC                                                     00011410
*                     ***********************************              00011420
* SAMLGTH      0      * BLOCK LENGTH  /  NOT USED       *              00011430
*                     ***********************************              00011440
* SAMTYP       4      *REC TYP/   NOT USED              * REC TYP = 3  00011450
*                     ***********************************              00011460
*SAMTIME       8      *           TIME (DEC)            *              00011470
*                     ***********************************              00011480
*SAMINTSC      12     *   NO OF INTERRUPTS     Z2       *              00011490
*                     ***********************************              00011500
```

```
* SALTFWA        16       * ACTIVE INS < FWA COUNTER          *
*                         ************************************
* SAGTLWA        20       * ACTIVE INS > LWA COUNTER          *
*                         ************************************
* SWLTFWA        24       *  WAIT INS < FWA COUNTER           *
*                         ************************************
* SWGTLWA        28       *  WAIT INS > LWA COUNTER           *
*                         ************************************
* SELTFWA        32       * LAST EXE INS < FWA COUNTER        *
*                         ************************************
* SEGTLWA        36       * LAST EXE INS > LWA COUNTER        *
*                         ************************************
*                         *  Z3    /  I-ADDRESS (A1)          *
*                         ************************************
*                         *  Z4    /Z5/      Z6               *
*                         ************************************
*                         *          MODULE NAME              *
*                         *                                   *
*                         ************************************
*                         *   00   /       FWA                *
*                         ************************************
*                         *   Z7   /       LWA                *
*                         ************************************
*                         *    .                              *
*                         *    .                              *
*                         *    .                              *
*                         ************************************
*  A1 - WILL BE USED ONLY FOR ABSOLUTE INS. ADDRESS WHICH WILL NOT
*           EXCEED 22 BITS IN LENGTH
*  Z2 - NO. OF INTERRUPTS WHERE AT LEAST ONE SAMPLE WAS TAKEN IN
*           THE REGION
*  Z3 - ALL ONES INDICATE NO MODULE COULD BE FOUND FOR THIS ADDRESS.
*           OTHER-INDEX TO MODULE NAME -- ZERO-MODULE TABLE OVERFLOW
*  Z4 - IF ZERO: THEN Z6 IS NOT USED UNLESS Z5 = 11
*           NOT ZERO: IT CONTAINS THE SEGMENT NO UNLESS Z5 = 11
*           ALL ONES INDICATE TOO MANY MODULES OR CORRECT SEG. COULD NOT
*           BE FOUND FOR THIS ADDRESS
*  Z5 - TWO BIT NUMBER DESCRIPTING THE CONDITION OF THE PP WHEN THE
*           SAMPLE ADDRESS WAS TAKEN
*           WAIT-00  EXEC-10  ACT-01  DATA SET ORIENTED WAIT-11
*  Z6 - IF Z4 NOT = 0 AND Z5 NOT = 11 THEN THE ADDRESS IN A1 IS MADE
*           RELATIVE TO THE START OF THE SEGMENT AND STORED IN Z6
*           IF Z5=11 THEN Z6 WILL CONTAIN THE INDEX INTO THE TIOT TABLE
*           TO THE DDNAME FOR WHICH THIS WAIT IS ASSOCIATED
*  Z7 - Z7 NOT = 0 IF MODULE DOING OVERLAYS
        EJECT
*                         ************************************
*               0         * BLOCK LENGTH     /  NOT USED      *
*                         ************************************
*               4         *   02    /    NOT USED             *
*                         ************************************
*               8         *     INDEX TO DDNAME               *
*                         ************************************
*              12         *               DDNAME              *
*                         *                                   *
*                         ************************************
*                         *                                   *
*                         *                                   *
*                         *    .                              *
*                         *    .                              *
*                         *    .                              *
```

```
*                         *                                   *
*                         *                                   *
*                         ************************************
        EJECT
*              DEC        ************************************
* LASTREC       0         * LENGTH          /  NOT USED       *
*                         ************************************
*               4         * REC TYP/  NOT USED                *  REC TYP = 3
**                        ************************************
* TRYTIME       8         *          TIME (BIN)               *
*                         ************************************
* MODTAB       12         *          MODULE NAME              *
*                         ************************************
*              20         *       FWA OF MODULE               *
*                         ************************************
*              24         *       LWA OF MODULE               *
*                         ************************************
*                         *    .                              *
*                         *    .                              *
*                         *    .                              *
*                         ************************************
*                         *          MODULE NAME              *
*                         ************************************
*                         *       FWA OF MODULE               *
*                         ************************************
*             NNN         *       LWA OF MODULE               *
*                         ************************************
         TITLE 'EQUATES'
R0       EQU    0
R1       EQU    1
R2       EQU    2
R3       EQU    3
R4       EQU    4
R5       EQU    5
R6       EQU    6
R7       EQU    7
R8       EQU    8
R9       EQU    9
R10      EQU    10
R11      EQU    11
R12      EQU    12
R13      EQU    13
R14      EQU    14
R15      EQU    15
HDRLGTH  EQU    BUFFER0
HDRRTYP  EQU    BUFFER0+4
HDRTIME  EQU    BUFFER0+8
HDRDATE  EQU    BUFFER0+12
HDRINT   EQU    BUFFER0+16
HDRJOBN  EQU    BUFFER0+20
HDRSTEPN EQU    BUFFER0+28
HDRCMN   EQU    BUFFER0+36
HDRFWA   EQU    BUFFER0+44
HDRRFWA  EQU    BUFFER0+48
HDRLWA   EQU    BUFFER0+52
HDRRLWA  EQU    BUFFER0+56
HDRCFIG  EQU    BUFFER0+60
HDREXTID EQU    BUFFER0+64
SAMLGTH  EQU    0
SAMRTYP  EQU    4
SAMTIME  EQU    8
```

```
SAMINTSC EQU    12
SALTFWA  EQU    16
SAGTLWA  EQU    20
SWLTFWA  EQU    24
SWGTLWA  EQU    28
SELTFWA  EQU    32
SEGTLWA  EQU    36
         END
```

We claim:

1. A method of obtaining data relating to the performance of a digital computer having plurality of operating elements including a memory, a number of registers, a central processing unit, an input-output device, and means for repeatedly interrupting the operation of said computer, said operating elements having at any instant of time a first set of operating conditions including indications of the status of each of said operating elements, said digital computer being capable of operating under the control of an operating system, said operating system being capable of controlling the loading into memory and the execution of instructions for a plurality of problem programs, said operating system maintaining at any instant of time a second set of operating conditions indicative of the status of said operating system, of each of said problem programs, and of a plurality of said operating elements, said second set including indications of which of said problem programs are using particular ones of said operating elements, each of said problem programs having at any instant of time a third set of operating conditions including indications of the locations in said memory occupied by the instruction last executed for said problem program and the status of a group of said operating elements at the time said last instruction was executed, said data to be obtained until the occurrence of a predetermined event such as the lapse of a predetermined time interval, and the selection of said data to be obtained is based on a set of predetermined criteria including whether certain of said operating elements are being utilized, said method comprising:

- operating said computer under the control of said operating system;
- causing an interruption of the operation of said computer in a manner asynchronous with said operation;
- in response to said interruption, selecting operating conditions from said second set of operating conditions based on said predetermined criteria;

storing indications of said selected operating conditions in said memory;

resuming the operation of the computer under the control of said operating system; and repeatedly causing further interruptions of the operation of said computer in a manner asynchronous with said operation until the occurrence of said event; and in response to each of said further interruptions, repeating said selecting, storing and resuming steps.

2. A method as set forth in claim 1, including, in response to each of said interruptions, selecting operating conditions from said first set of operating conditions, and storing indications of said operating condition selected from said first set in said memory.

3. A method as set forth in claim 1 wherein said predetermined criteria includes whether said central processing unit is busy.

4. A method as set forth in claim 1, wherein is included the step of outputting said stored indications of the selected operating conditions to said input-output device.

5. A method of obtaining data relating to the performance of a digital computer having a plurality of operating elements including a memory, a number of registers, a central processing unit, an input-output device, and means for repeatedly interrupting the operation of said computer, said operating elements having at any instant of time a first set of operating conditions including indications of the status of each of said operating elements, said digital computer being capable of operating under the control of an operating system, said operating system being capable of controlling the loading into memory and the execution instructions for a plurality of problem programs, said operating system maintaining at any instant of time a second set of operating conditions indicative of the status of said operating system, of each of said problem programs, and of a plurality of said operating elements, said second set including indications of which of said programs are using particular ones of said operating elements, each of said problem programs having at any instant of time a third set of operating conditions including indications of the locations in said memory occupied by the instruction last executed for said problem program and the status of a group of said operating elements at the time said last instruction was executed, said data to be obtained until the occurrence of a predetermined event such as the completion of execution of instructions for a preselected problem program, and the selection of said data to be obtained is based on a set of predetermined criteria including whether said preselected one of said problem programs is loaded in said memory, and whether any of its instructions are being executed and, if so, at what location in said memory the instruction for said preselected problem program currently being executed is stored, said method comprising:

loading said preselected problem program into said memory under control of said operating system;

operating said computer under the control of said operating system;

causing an interruption of the operation of said computer in a manner asynchronous with said operation;

in response to said interruption, selecting operating conditions from said third set of operating conditions relating to said preselected problem program based on said predetermined criteria;

storing indications of said selected operating conditions in said memory;

resuming the operation of the computer under the control of said operating system; and repeatedly causing further interruptions of the operation of said computer in a manner asynchronous with said operation until the occurrence of said event; and in response to each of said further interruptions, repeating said selecting, storing and resuming steps.

6. A method as set forth in claim 5, including, in response to each of said interruptions, selecting operating conditions from said second set of operating conditions, and storing indications of said operating conditions selected from said second set in said memory.

7. A method as set forth in claim 5, wherein said preselected problem program is comprised of a plurality of tasks and said predetermined criteria include whether any of said tasks is divided into a plurality of subprograms, with at least two of said subprograms being capable of occupying the same area of memory at different times during execution of instructions for said divided task, said selected operating conditions being at least indicative of which of said subprograms for each of said divided tasks is occupying said area of memory at the time of said interruptions.

8. A method as set forth in claim 5, wherein said preselected problem program is comprised of a plurality of tasks and said predetermined criteria includes whether instructions for each task have been executed since the last interruption, said selected operating conditions being at least indicative of the last executed instruction in each of said tasks for which instructions have been executed.

9. A method as set forth in claim 5, wherein is included the step of outputting the stored indications of the selected operating conditions to said input-output device.

* * * * *